US011994581B2

(12) United States Patent
Tamaoki

(10) Patent No.: US 11,994,581 B2
(45) Date of Patent: May 28, 2024

(54) INFORMATION PROCESSING DEVICE AND INFORMATION PROCESSING METHOD, IMAGING DEVICE, COMPUTER PROGRAM, INFORMATION PROCESSING SYSTEM, AND MOVING BODY DEVICE

(71) Applicant: Sony Corporation, Tokyo (JP)

(72) Inventor: Akihiro Tamaoki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 681 days.

(21) Appl. No.: 17/254,212

(22) PCT Filed: May 14, 2019

(86) PCT No.: PCT/JP2019/019028
§ 371 (c)(1),
(2) Date: Dec. 18, 2020

(87) PCT Pub. No.: WO2020/003776
PCT Pub. Date: Jan. 2, 2020

(65) Prior Publication Data
US 2021/0264224 A1  Aug. 26, 2021

(30) Foreign Application Priority Data
Jun. 29, 2018  (JP) ................................. 2018-125561

(51) Int. Cl.
G06V 20/00 (2022.01)
G01S 13/86 (2006.01)
(Continued)

(52) U.S. Cl.
CPC .......... *G01S 13/931* (2013.01); *G01S 13/867* (2013.01); *G01S 13/93* (2013.01); *G06F 18/251* (2023.01); *G06V 20/56* (2022.01)

(58) Field of Classification Search
CPC ...... G01S 13/931; G01S 13/867; G01S 13/93; G01S 7/2922; G01S 7/354; G01S 7/411;
(Continued)

(56) References Cited

U.S. PATENT DOCUMENTS 5,475,494 A  12/1995  Nishida
6,240,369 B1  5/2001  Foust
(Continued)

FOREIGN PATENT DOCUMENTS

CN  102576493 A  7/2012
CN  108001457 A  5/2018
(Continued)

OTHER PUBLICATIONS

International Written Opinion and English translation thereof mailed Aug. 20, 2019 in connection with International Application No. PCT/JP2019/019028.
(Continued)

*Primary Examiner* — Ping Y Hsieh
(74) *Attorney, Agent, or Firm* — Wolf, Greenfield & Sacks, P.C.

(57) ABSTRACT

Provided is an information processing device for performing fusion processing of a plurality of sensors for recognizing the outside world.

An information processing device includes a control unit that controls an amount of information to be used for object detection in a first information sensed by a first sensor on the basis of second information sensed by a second sensor. The first sensor is a camera, and the second sensor is a radar. Then, the control unit determines the target area from the captured image on the basis of information on at least one of a position, a speed, or a size of an object detected by the radar.

13 Claims, 13 Drawing Sheets

(51) Int. Cl.
*G01S 13/93* (2020.01)
*G01S 13/931* (2020.01)
*G06F 18/25* (2023.01)
*G06V 20/56* (2022.01)

(58) Field of Classification Search
CPC .. G01S 13/44; G01S 13/58; G01S 2013/9323; G01S 2013/93271; G01S 13/86; G06F 18/251; G06V 20/56; G08G 1/166; G08G 1/16; H04W 4/027; H04W 4/44
See application file for complete search history.

(56) References Cited

U.S. PATENT DOCUMENTS

| | | | |
|---|---|---|---|
| 6,492,935 B1* | 12/2002 | Higuchi | G01S 13/867 342/54 |
| 2008/0164985 A1 | 7/2008 | Iketani et al. | |
| 2009/0201192 A1 | 8/2009 | Tokoro et al. | |
| 2010/0007476 A1* | 1/2010 | Klotz | G06V 20/58 340/425.5 |

FOREIGN PATENT DOCUMENTS

| | | |
|---|---|---|
| EP | 1950689 A2 | 7/2008 |
| JP | H07129900 A | 5/1995 |
| JP | 2002071796 A | 3/2002 |
| JP | 2007003210 A | 1/2007 |
| JP | 2007132748 A | 5/2007 |
| JP | 2007-155728 A | 6/2007 |
| JP | 2007255979 A | 10/2007 |
| JP | 2008037361 A | 2/2008 |
| JP | 2008509413 A | 3/2008 |
| JP | 2008-172441 A | 7/2008 |
| JP | 2010132056 A | 6/2010 |
| JP | 2012-101620 A | 5/2012 |
| JP | 2017062638 A | 3/2017 |
| JP | 2017215214 A | 12/2017 |

OTHER PUBLICATIONS

International Preliminary Report on Patentability and English translation thereof mailed Jan. 7, 2021 in connection with International Application No. PCT/JP2019/019028.
Extended European Search Report issued Jul. 8, 2021 in connection with European Application No. 19825263.7.
International Search Report and English translation thereof mailed Aug. 20, 2019 in connection with International Application No. PCT/JP2019/019028.

* cited by examiner

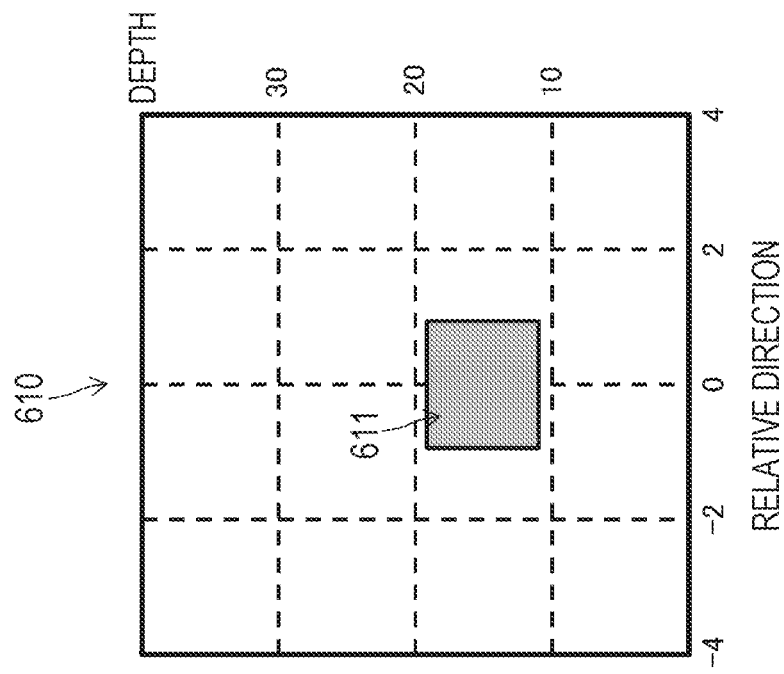
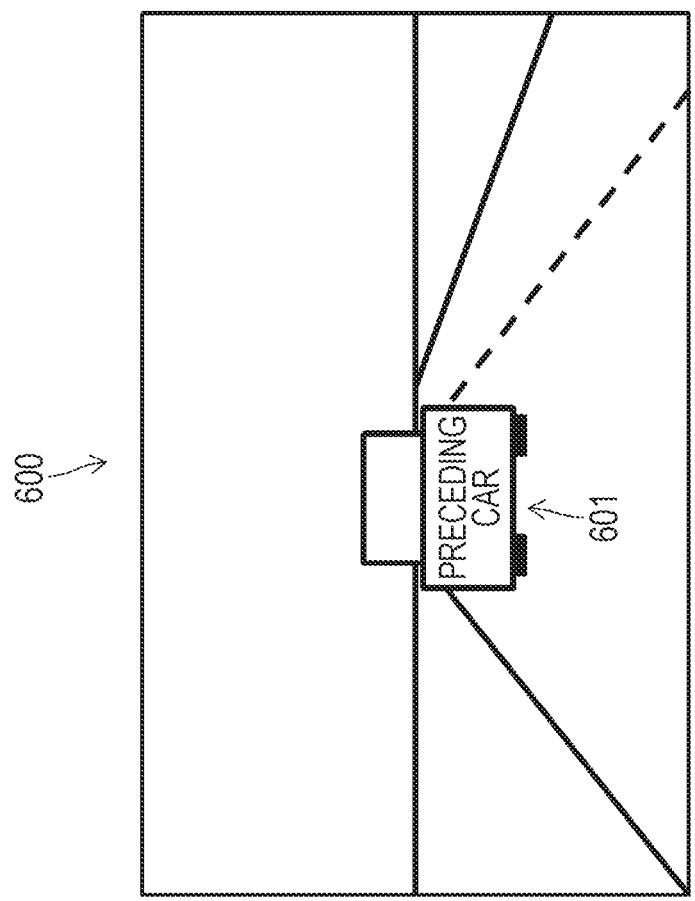
FIG. 6

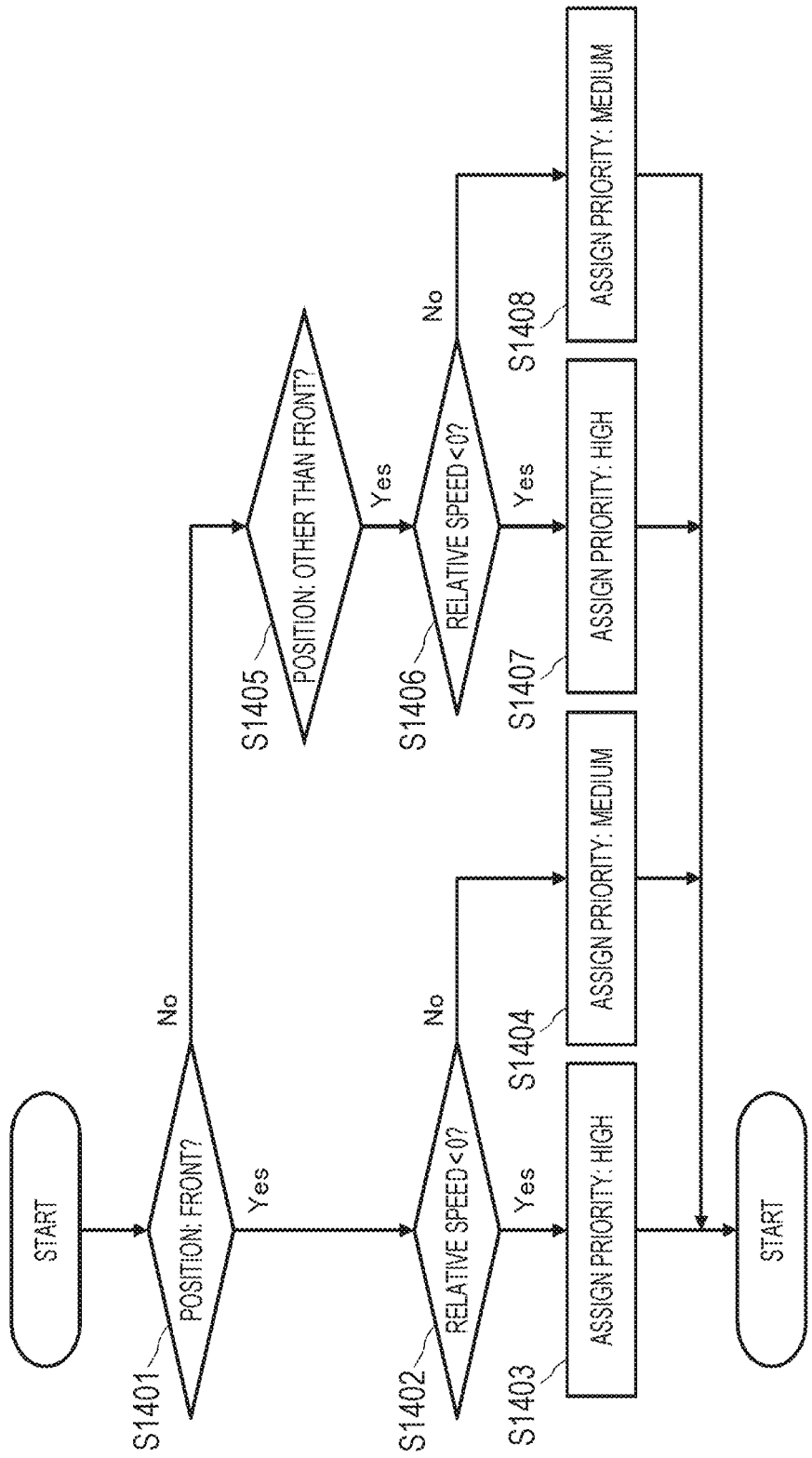

INFORMATION PROCESSING DEVICE AND INFORMATION PROCESSING METHOD, IMAGING DEVICE, COMPUTER PROGRAM, INFORMATION PROCESSING SYSTEM, AND MOVING BODY DEVICE

CROSS-REFERENCE TO RELATED APPLICATIONS

This application claims the benefit under 35 U.S.C. § 371 as a U.S. National Stage Entry of International Application No. PCT/JP2019/019028, filed in the Japanese Patent Office as a Receiving Office on May 14, 2019, which claims priority to Japanese Patent Application Number JP2018-125561, filed in the Japanese Patent Office on Jun. 29, 2018, each of which is hereby incorporated by reference in its entirety.

TECHNICAL FIELD

The technology disclosed in this specification relates to an information processing device and an information processing method, an imaging device, a computer program, an information processing system, and a moving body device that process detection information of a plurality of sensors for mainly recognizing the outside world.

BACKGROUND ART

To implement automatic driving or Advanced Driver Assistance System (ADAS), it is necessary to detect various objects such as another vehicle, a person, a lane, and the like, and it is necessary to detect the objects in various environments such as not only in the daytime in fine weather, but also in rainy weather and at night. For this reason, many different types of outside world recognition sensors, such as a camera, a millimeter wave radar, and a laser radar, are beginning to be mounted in a vehicle.

Each sensor has its strengths and weaknesses, and the recognition performance of the sensor may degrade depending on the type or size of an object to be recognized, the distance to the object, the weather at the time of detection, and the like. For example, an in-vehicle radar has high distance accuracy and relative speed accuracy, but low angle accuracy, and has no identification function for identifying the type of an object, or has that of low accuracy. On the other hand, the camera has relatively low distance accuracy and relative speed accuracy, but has good angle accuracy and identification accuracy. Thus, not limited to using individual sensors alone, two or more sensors are combined and a feature of each sensor is utilized, thereby contributing more accurate outside world recognition. In the following, combining two or more sensors will be referred to as "sensor fusion" or "fusion".

For example, a peripheral monitoring sensor has been devised that performs area division for data respectively detected by a millimeter wave radar and an image sensor, and, for an object (target) existing in a predetermined area, creates information regarding the object on the basis of information acquired by the both sensors (see Patent Document 1).

Furthermore, an image processing device has been devised that creates prediction area information for recognizing an object area of an object when the object outside an imaging range of an imaging means enters the imaging range, on the basis of distance information from a reflected wave of an electromagnetic wave radiated outside the imaging range of the imaging means to the object outside the imaging range, and shortens the time from when the imaging means starts imaging a detection target until an in-vehicle device operates (see Patent Document 2).

Furthermore, a vehicle outside-world sensing device has been devised that corrects a deviation angle between a traveling direction of a vehicle and the axial direction of an in-vehicle camera and an obstacle detection sensor mounted on the vehicle on the same axis (see Patent Document 3).

CITATION LIST

Patent Document

Patent Document 1: Japanese Patent Application Laid-Open No. 2001-99930
Patent Document 2: Japanese Patent Application Laid-Open No. 2015-195018
Patent Document 3: Japanese Patent Application Laid-Open No. 2014-228943

SUMMARY OF THE INVENTION

Problems to be Solved by the Invention

An object of the technology disclosed in this specification is to provide an information processing device and an information processing method, an imaging device, a computer program, an information processing system, and a moving body device that perform fusion processing of a plurality of sensors for mainly recognizing the outside world.

Solutions to Problems

A first aspect of the technology disclosed in this specification is an information processing device including a control unit that controls an amount of information to be used for object detection in a first information sensed by a first sensor on the basis of second information sensed by a second sensor.

The first sensor is a camera, and the second sensor is a radar. Then, the control unit determines the target area to be used for object detection from the captured image on the basis of information on at least one of a position, a speed, or a size of the object detected by the radar.

The information processing device according to the first aspect may further include a condition determination unit that determines an imaging condition of the camera. Then, the control unit may set a threshold value on the basis of a determination result of the condition determination unit, and determine the target area from the captured image on the basis of the information of the object detected by the radar by using the threshold value.

Furthermore, the information processing device according to the first aspect may further include a size determination unit that determines a size of the target area on the basis of an intensity of a reflected wave to be detected by the radar. Then, the control unit may determine the target area from the captured image on the basis of the size determined by the size determination unit.

Furthermore, the information processing device according to the first aspect may further include a priority determination unit that determines a priority of each object detected by the radar. Then, the control unit may determine the target area from the captured image on the basis of the priority.

Furthermore, a second aspect of the technology disclosed in this specification is an information processing method including a control step of controlling an amount of information to be used for object detection in a first information sensed by a first sensor on the basis of second information sensed by a second sensor.

Furthermore, a third aspect of the technology disclosed in this specification is a computer program written in a computer readable format to execute, on a computer, processing for controlling an amount of information to be used for object detection in a first information sensed by a first sensor on the basis of second information sensed by a second sensor.

The computer program according to the third aspect defines the computer program written in the computer readable format to implement predetermined processing on the computer. In other words, by installing the computer program according to the third aspect on the computer, a collaborative function is exhibited on the computer, and functions and effects can be obtained similar to the information processing device according to the first aspect.

Furthermore, a fourth aspect of the technology disclosed in this specification is
an imaging device including:
an imaging unit; and
a control unit that determines a target area to be used for object detection in a captured image by the imaging unit on the basis of information sensed by another sensor.

Furthermore, a fifth aspect of the technology disclosed in this specification is
an information processing system including:
a first object detection unit that detects an object on the basis of an amount of information determined on the basis of second information sensed by a second sensor, in first information sensed by a first sensor; and
a determination unit that determines the object by fusing an object detection result by the first object detection unit with an object detection result using the second sensor.

However, the term "system" as used herein refers to a logical collection of multiple devices (or functional modules that implement a specific function), and it does not matter whether or not the devices and functional modules are in a single housing.

Furthermore, a sixth aspect of the technology disclosed in this specification is
a moving body device including:
a moving means;
a first sensor;
a second sensor;
a first object detection unit that detects an object on the basis of an amount of information determined on the basis of second information sensed by a second sensor, in first information sensed by a first sensor;
a determination unit that determines the object by fusing an object detection result by the first object detection unit with an object detection result using the second sensor; and
a drive control unit that controls drive of the moving means on the basis of a determination result by the determination unit.

Effects of the Invention

According to the technology disclosed in this specification, it is possible to provide an information processing device and an information processing method, an imaging device, a computer program, an information processing system, and a moving body device that perform fusion processing of a plurality of sensors for mainly recognizing the outside world.

Note that, the effects described in this specification are merely examples, and the effects of the present invention are not limited to them. Furthermore, the present invention may have additional effects other than the effects described above.

Still other objects, features, and advantages of the technology disclosed in this specification will become apparent from the detailed description based on embodiments and attached drawings to be described later.

BRIEF DESCRIPTION OF DRAWINGS

FIG. 6 is a diagram illustrating a difference in the amount of data transfer to an ECU from each of the sensor unit of the millimeter wave radar 202 and the camera 201.

FIG. 14 is a flowchart illustrating a processing procedure for determining the priority of each object detected by an object detection unit 205 in a priority determination unit 1302.

MODE FOR CARRYING OUT THE INVENTION

Hereinafter, embodiments of the technology disclosed in this specification will be described in detail with reference to the drawings.

Figure 1:
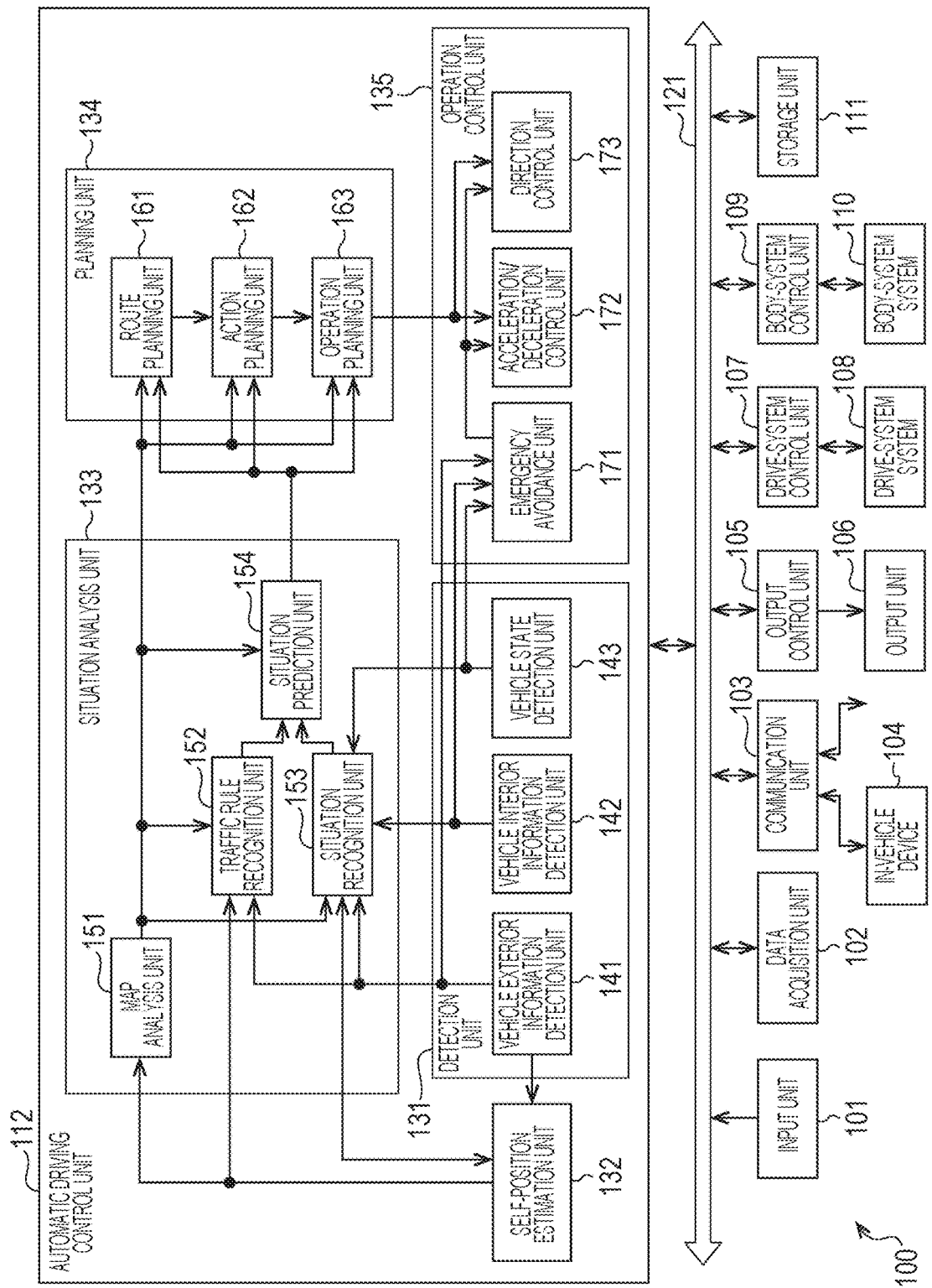
FIG. 1 is a block diagram illustrating a schematic functional configuration example of a vehicle control system 100.

FIG. 1 is a block diagram illustrating a schematic functional configuration example of a vehicle control system 100 that is an example of a moving body control system to which the present technology can be applied.

Note that, hereinafter, in a case where a vehicle provided with the vehicle control system 100 is distinguished from other vehicles, the vehicle is referred to as a host car or a host vehicle.

The vehicle control system 100 includes an input unit 101, a data acquisition unit 102, a communication unit 103, an in-vehicle device 104, an output control unit 105, an output unit 106, a drive-system control unit 107, a drive-system system 108, a body-system control unit 109, a body-system system 110, a storage unit 111, and an automatic driving control unit 112. The input unit 101, the data acquisition unit 102, the communication unit 103, the output control unit 105, the drive-system control unit 107, the body-system control unit 109, the storage unit 111, and the automatic driving control unit 112 are connected to each other via a communication network 121. The communication network 121 includes, for example, an in-vehicle communication network conforming to an arbitrary standard such as Controller Area Network (CAN), Local Interconnect Network (LIN), Local Area Network (LAN), or FlexRay (registered trademark), a bus, and the like. Note that, the units of the vehicle control system 100 may be directly connected to each other without using the communication network 121.

Note that, hereinafter, in a case where the units of the vehicle control system 100 communicate with each other via the communication network 121, the description of the communication network 121 is omitted. For example, in a case where the input unit 101 and the automatic driving control unit 112 communicate with each other via the communication network 121, it is simply described that the input unit 101 and the automatic driving control unit 112 communicate with each other.

The input unit 101 includes a device to be used by an occupant to input various data, instructions, and the like. For example, the input unit 101 includes operation devices such as a touch panel, a button, a microphone, a switch, and a lever, operation devices that enable input by a method other than manual operation such as voice or gesture, and the like. Furthermore, for example, the input unit 101 may be a remote control device that uses infrared rays or other radio waves, or an externally connected device such as a mobile device or a wearable device compatible with the operation of the vehicle control system 100. The input unit 101 generates an input signal on the basis of the data, instructions, and the like input by the occupant, and supplies the input signal to each unit of the vehicle control system 100.

The data acquisition unit 102 includes various sensors that acquire data to be used for processing of the vehicle control system 100, and supplies the acquired data to each unit of the vehicle control system 100.

For example, the data acquisition unit 102 includes various sensors for detecting a host car's state and the like. Specifically, for example, the data acquisition unit 102 includes a gyro sensor, an acceleration sensor, an inertial measurement unit (IMU), and sensors and the like for detecting an amount of operation of the accelerator pedal, an amount of operation of the brake pedal, a steering angle of the steering wheel, an engine speed, a motor speed, or the wheel's rotational speed, and the like.

Furthermore, for example, the data acquisition unit 102 includes various sensors for detecting information outside the host car. Specifically, for example, the data acquisition unit 102 includes an imaging device such as a Time of Flight (ToF) camera, a stereo camera, a monocular camera, an infrared camera, any of other cameras, or the like. Furthermore, for example, the data acquisition unit 102 includes an environmental sensor for detecting weather, climate, or the like, and a peripheral information detection sensor for detecting an object around the host car. The environmental sensor includes, for example, a raindrop sensor, a fog sensor, a sunshine sensor, a snow sensor, and the like. The peripheral information detection sensor includes, for example, an ultrasonic sensor, a radar, or a Light Detection and Ranging (LiDAR) device (Laser Imaging Detection and Ranging (LiDAR) device), a sonar, and the like.

Moreover, for example, the data acquisition unit 102 includes various sensors for detecting a current position of the host car. Specifically, for example, the data acquisition unit 102 includes a Global Navigation Satellite System (GNSS) receiver that receives a GNSS signal from a GNSS satellite, and the like.

Furthermore, for example, the data acquisition unit 102 includes various sensors for detecting information inside the vehicle. Specifically, for example, the data acquisition unit 102 includes an imaging device that images a driver, a biometric sensor that detects biological information of the driver, a microphone that collects voice in the vehicle interior, and the like. The biometric sensor is provided, for example, on a seat surface, a steering wheel, or the like, and detects biological information of the occupant sitting on a seat or the driver holding the steering wheel.

The communication unit 103 communicates with the in-vehicle device 104 and various devices outside the vehicle, a server, a base station, and the like, transmits data supplied from the units of the vehicle control system 100, and supplies received data to the units of the vehicle control system 100. Note that, a communication protocol supported by the communication unit 103 is not particularly limited, and the communication unit 103 can support a plurality of types of communication protocols.

For example, the communication unit 103 performs wireless communication with the in-vehicle device 104 by wireless LAN, Bluetooth (registered trademark), Near Field Communication (NFC), Wireless USB (WUSB), or the like. Furthermore, for example, the communication unit 103 performs wired communication with the in-vehicle device 104 by a Universal Serial Bus (USB), High-Definition Multimedia Interface (HDMI), Mobile High-definition Link (MHL), or the like via a connection terminal (and a cable if necessary) not illustrated.

Moreover, for example, the communication unit 103 communicates with a device (for example, an application server or a control server) existing on an external network (for example, the Internet, a cloud network, or a company specific network) via a base station or an access point. Furthermore, for example, the communication unit 103 communicates with a terminal existing in the vicinity of the host car (for example, a terminal of a pedestrian or a store, or a Machine Type Communication (MTC) terminal) by using a Peer To Peer (P2P) technology. Moreover, for example, the communication unit 103 performs V2X communication such as Vehicle to Vehicle communication, Vehicle to Infrastructure communication, Vehicle to Home (host car to home) communication, and Vehicle to Pedestrian communication. Furthermore, for example, the communication unit 103 includes a beacon reception unit, receives radio waves or electromagnetic waves transmitted from a wireless station or the like installed on a road, and acquires information such as the current position, congestion, traffic regulation, or required time.

The in-vehicle device 104 includes, for example, a mobile device or a wearable device owned by the occupant, an information device that is carried in or attached to the host car, a navigation device that searches for a route to an arbitrary destination, and the like.

The output control unit 105 controls output of various types of information to the occupant of the host car or the outside of the host car. For example, the output control unit 105 generates an output signal including at least one of visual information (for example, image data) or auditory information (for example, voice data), and supplies the output signal to the output unit 106 to control output of the visual information and the auditory information from the output unit 106. Specifically, for example, the output control unit 105 synthesizes image data imaged by different imaging devices of the data acquisition unit 102 to generate a bird's-eye image, a panoramic image, or the like, and outputs an output signal including the generated image to the output unit 106. Furthermore, for example, the output control unit 105 generates voice data including a warning sound, a warning message, or the like for a danger such as collision, contact, or entry into a danger zone, and outputs an output signal including the generated voice data to the output unit 106.

The output unit 106 includes a device capable of outputting the visual information or the auditory information to the occupant of the host car or to the outside of the host car. For example, the output unit 106 includes a display device, an instrument panel, an audio speaker, headphones, a wearable device such as an eyeglass type display worn by the occupant, a projector, a lamp, and the like. The display device included in the output unit 106 may be a device that displays visual information in a field of view of the driver, for example, a head-up display, a transmissive display, a device having an Augmented Reality (AR) display function, and the like, besides a device having a normal display.

The drive-system control unit 107 controls the drive-system system 108 by generating various control signals and supplying the control signals to the drive-system system 108. Furthermore, the drive-system control unit 107 supplies a control signal to each unit other than the drive-system system 108 as necessary to perform notification of a control state of the drive-system system 108, and the like.

The drive-system system 108 includes various devices related to the drive system of the host car. For example, the drive-system system 108 includes: a driving force generation device that generates driving force such as an internal combustion engine or a drive motor; a driving force transmission mechanism that transmits the driving force to the wheels; a steering mechanism that adjusts a steering angle; a braking device that generates braking force; an Antilock Brake System (ABS); an Electronic Stability Control (ESC); an electric power steering device; and the like.

The body-system control unit 109 controls the body-system system 110 by generating various control signals and supplying the control signals to the body-system system 110. Furthermore, the body-system control unit 109 supplies a control signal to each unit other than the body-system system 110 as necessary to perform notification of a control state of the body-system system 110, and the like.

The body-system system 110 includes various devices of the body system mounted on the vehicle body. For example, the body-system system 110 includes a keyless entry system, a smart key system, a power window device, a power seat, a steering wheel, an air conditioner, various lamps (for example, head lamps, back lamps, brake lamps, blinkers, fog lamps, and the like), and the like.

The storage unit 111 includes, for example, a magnetic storage device such as a Read Only Memory (ROM), a Random Access Memory (RAM), a Hard Disc Drive (HDD), a semiconductor storage device, an optical storage device, a magneto-optical storage device, and the like. The storage unit 111 stores various programs, data, and the like to be used by each unit of the vehicle control system 100. For example, the storage unit 111 stores a map data such as a three-dimensional high-precision map such as a dynamic map, a global map that is less accurate than the high-precision map and covers a large area, and a local map including information around the host car.

The automatic driving control unit 112 performs control related to automatic driving such as autonomous traveling or driving assistance. Specifically, for example, the automatic driving control unit 112 performs cooperative control aiming for implementing functions of advanced driver assistance system (ADAS) including collision avoidance or shock mitigation of the host car, follow-up traveling based on an inter-vehicle distance, vehicle speed maintaining traveling, host car collision warning, host car lane departure warning, or the like. Furthermore, for example, the automatic driving control unit 112 performs cooperative control aiming for automatic driving that autonomously travels without depending on operation of the driver. The automatic driving control unit 112 includes a detection unit 131, a self-position estimation unit 132, a situation analysis unit 133, a planning unit 134, and an operation control unit 135.

The detection unit 131 detects various types of information necessary for controlling automatic driving. The detection unit 131 includes a vehicle exterior information detection unit 141, a vehicle interior information detection unit 142, and a vehicle state detection unit 143.

The vehicle exterior information detection unit 141 performs detection processing of information outside the host car on the basis of data or signals from the units of the vehicle control system 100. For example, the vehicle exterior information detection unit 141 performs detection processing, recognition processing, and tracking processing of an object around the host car, and detection processing of a distance to the object. The object to be detected includes, for example, a vehicle, a person, an obstacle, a structure, a road, a traffic light, a traffic sign, a road marking, and the like. Furthermore, for example, the vehicle exterior information detection unit 141 performs detection processing of an environment around the host car. The surrounding environment to be detected includes, for example, weather, temperature, humidity, brightness, a state of a road surface, and the like. The vehicle exterior information detection unit 141 supplies data indicating a result of the detection processing to: the self-position estimation unit 132; a map analysis unit 151, a traffic rule recognition unit 152, and a situation recognition unit 153 of the situation analysis unit 133; an emergency avoidance unit 171 of the operation control unit 135; and the like.

The vehicle interior information detection unit 142 performs detection processing of information inside the vehicle on the basis of data or signals from the units of the vehicle control system 100. For example, the vehicle interior information detection unit 142 performs driver authentication processing and recognition processing, driver's state detection processing, occupant detection processing, in-vehicle environment detection processing, and the like. The driver's state to be detected includes, for example, a physical condition, a wakefulness level, a concentration level, a fatigue level, a line-of-sight direction, and the like. The in-vehicle environment to be detected includes, for example, temperature, humidity, brightness, a smell, and the like. The vehicle interior information detection unit 142 supplies data indicating a result of the detection processing to the situation recognition unit 153 of the situation analysis unit 133, the emergency avoidance unit 171 of the operation control unit 135, and the like.

The vehicle state detection unit 143 performs detection processing of the host car's state on the basis of data or signals from the units of the vehicle control system 100. The host car's state to be detected includes, for example, a speed, an acceleration, a steering angle, presence/absence and content of abnormality, a state of driving operation, a position and a tilt of the power seat, a state of a door lock, states of other in-vehicle devices, and the like. The vehicle state detection unit 143 supplies data indicating a result of the detection processing to the situation recognition unit 153 of the situation analysis unit 133, the emergency avoidance unit 171 of the operation control unit 135, and the like.

The self-position estimation unit 132 performs estimation processing of a position and an orientation of the host car on the basis of data or signals from the units of the vehicle control system 100 such as the vehicle exterior information detection unit 141, the situation recognition unit 153 of the situation analysis unit 133, and the like. Furthermore, the self-position estimation unit 132 generates a local map (hereinafter, referred to as a self-position estimation map) to be used for estimating a self-position, as necessary. The self-position estimation map is, for example, a highly accurate map using a technology such as Simultaneous Localization and Mapping (SLAM). The self-position estimation unit 132 supplies data indicating a result of the estimation processing to the map analysis unit 151, traffic rule recognition unit 152, and situation recognition unit 153 of the situation analysis unit 133, and the like. Furthermore, the self-position estimation unit 132 causes the storage unit 111 to store the self-position estimation map.

The situation analysis unit 133 performs analysis processing of situations of the host car and the surroundings. The situation analysis unit 133 includes the map analysis unit 151, the traffic rule recognition unit 152, the situation recognition unit 153, and a situation prediction unit 154.

The map analysis unit 151 performs analysis processing of various maps stored in the storage unit 111 while using data or signals from the units of the vehicle control system 100 such as the self-position estimation unit 132 and the vehicle exterior information detection unit 141, to build a map including information necessary for automatic driving processing. The map analysis unit 151 supplies the built map to the traffic rule recognition unit 152, the situation recognition unit 153, the situation prediction unit 154, and a route planning unit 161, an action planning unit 162, an operation planning unit 163 of the planning unit 134, and the like.

The traffic rule recognition unit 152 performs recognition processing of a traffic rule around the host car on the basis of data or signals from the units of the vehicle control system 100 such as the self-position estimation unit 132, the vehicle exterior information detection unit 141, and the map analysis unit 151. By this recognition processing, for example, a position and a state of a signal around the host car, content of traffic regulation around the host car, a lane in which the vehicle can travel, and the like are recognized. The traffic rule recognition unit 152 supplies data indicating a result of the recognition processing to the situation prediction unit 154 and the like.

The situation recognition unit 153 performs recognition processing of a situation regarding the host car on the basis of data or signals from the units of the vehicle control system 100 such as the self-position estimation unit 132, the vehicle exterior information detection unit 141, the vehicle interior information detection unit 142, the vehicle state detection unit 143, and the map analysis unit 151. For example, the situation recognition unit 153 performs recognition processing of a situation of the host car, a situation around the host car, a situation of the driver of the host car, and the like. Furthermore, the situation recognition unit 153 also generates a local map (hereinafter, referred to as a situation recognition map) to be used for recognizing the situation around the host car, as necessary. The situation recognition map is, for example, an occupancy grid map.

The situation of the host car to be recognized includes, for example, a position, orientation, and movement (for example, a speed, an acceleration, a moving direction, and the like) of the host car, presence/absence and content of abnormality, and the like. The situation around the host car to be recognized, for example, includes: a type and a position of a surrounding stationary object; a type, a position, and movement (for example, a speed, an acceleration, a moving direction, and the like) of a surrounding moving object; a configuration and a state of a road surface of a surrounding road; surrounding weather, temperature, humidity, and brightness; and the like. The driver's state to be recognized includes, for example, a physical condition, a wakefulness level, a concentration level, a fatigue level, movement of a line-of-sight, driving operation, and the like.

The situation recognition unit 153 supplies data indicating a result of the recognition processing (including the situation recognition map, as necessary) to the self-position estimation unit 132, the situation prediction unit 154, and the like. Furthermore, the situation recognition unit 153 causes the storage unit 111 to store the situation recognition map.

The situation prediction unit 154 performs prediction processing of the situation regarding the host car on the basis of data or signals from the units of the vehicle control system 100 such as the map analysis unit 151, the traffic rule recognition unit 152, and the situation recognition unit 153. For example, the situation prediction unit 154 performs prediction processing of the situation of the host car, the situation around the host car, the situation of the driver, and the like.

The situation of the host car to be predicted includes, for example, movement of the host car, occurrence of abnormality, a travelable distance, and the like. The situation around the host car to be predicted includes, for example, movement of a moving object around the host car, a change in a state of a signal, a change in an environment such as weather, and the like. The situation of the driver to be predicted includes, for example, behavior and a physical condition of the driver.

The situation prediction unit 154 supplies data indicating a result of the prediction processing together with the data from the traffic rule recognition unit 152 and the situation recognition unit 153 to the route planning unit 161, action planning unit 162, and operation planning unit 163 of the planning unit 134, and the like.

The route planning unit 161 plans a route to a destination on the basis of data or signals from the units of the vehicle control system 100 such as the map analysis unit 151 and the situation prediction unit 154. For example, the route planning unit 161 sets the route from the current position to the designated destination on the basis of the global map. Furthermore, for example, the route planning unit 161 appropriately changes the route on the basis of situations of congestion, accident, traffic regulation, construction, and the like, a physical condition of the driver, and the like. The route planning unit 161 supplies data indicating the planned route to the action planning unit 162 and the like.

The action planning unit 162 plans an action of the host car for safely traveling the route planned by the route planning unit 161 within a planned time on the basis of data or signals from the units of the vehicle control system 100 such as the map analysis unit 151 and the situation prediction unit 154. For example, the action planning unit 162 makes a plan such as a start, stop, traveling direction (for example, going forward, going backward, left turn, right turn, direction change, and the like), driving lane, traveling speed, and overtaking. The action planning unit 162 supplies data indicating the planned action of the host car to the operation planning unit 163 and the like.

The operation planning unit 163 plans operation of the host car for implementing the action planned by the action planning unit 162 on the basis of data or signals from the units of the vehicle control system 100 such as the map analysis unit 151 and the situation prediction unit 154. For example, the operation planning unit 163 makes a plan such as acceleration, deceleration, and a traveling track. The operation planning unit 163 supplies data indicating the planned operation of the host car to an acceleration/deceleration control unit 172 and a direction control unit 173 of the operation control unit 135, and the like.

The operation control unit 135 controls the operation of the host car. The operation control unit 135 includes the emergency avoidance unit 171, the acceleration/deceleration control unit 172, and the direction control unit 173.

The emergency avoidance unit 171 performs detection processing of an emergency such as collision, contact, entry into a danger zone, abnormality of the driver, or abnormality of the vehicle on the basis of detection results of the vehicle exterior information detection unit 141, the vehicle interior information detection unit 142, and the vehicle state detection unit 143. In a case where occurrence of an emergency is detected, the emergency avoidance unit 171 plans operation of the host car to avoid the emergency, such as a sudden stop or a sudden turning. The emergency avoidance unit 171 supplies data indicating the planned operation of the host car to the acceleration/deceleration control unit 172, the direction control unit 173, and the like.

The acceleration/deceleration control unit 172 performs acceleration/deceleration control for implementing the operation of the host car planned by the operation planning unit 163 or the emergency avoidance unit 171. For example, the acceleration/deceleration control unit 172 calculates a control target value of the driving force generation device or the braking device for implementing the planned acceleration, deceleration, or sudden stop, and supplies a control command indicating the calculated control target value to the drive-system control unit 107.

The direction control unit 173 performs direction control for implementing the operation of the host car planned by the operation planning unit 163 or the emergency avoidance unit 171. For example, the direction control unit 173 calculates a control target value of the steering mechanism for implementing the traveling track or sudden turning planned by the operation planning unit 163 or the emergency avoidance unit 171, and supplies a control command indicating the calculated control target value to the drive-system control unit 107.

Many different types of outside world recognition sensors such as a camera, a millimeter wave radar, and a laser radar are beginning to be mounted in the vehicle to perform more accurate outside world recognition toward implementation of the automatic driving and ADAS. However, each sensor has its strengths and weaknesses depending on the detection principle. For example, a camera that images visible light is not good at dark places, and a radar that detects reflection of radio waves is not good at an object that does not easily reflect the radio waves, such as a person or an animal. Table 1 below summarizes the strengths and weaknesses of the radar (millimeter wave radar), camera, and laser radar (LiDAR). In the table, ⊚ means that it is very good at (having high accuracy), ○ means that it is good at (having good accuracy), and Δ means that it is not good at (accuracy is insufficient).

TABLE 1

| Sensor Type | Radar | Camera | LiDAR |
| --- | --- | --- | --- |
| Measurement Distance | ○ | Δ | ⊚ |
| Angle and Resolution | Δ | ⊚ | ○ |
| Performance in Bad Weather | ⊚ | Δ | ○ |
| Performance at Night | ⊚ | ○ | ⊚ |
| Classification of Targets | Δ | ⊚ | ○ |

Thus, a fusion technology has been developed that implements more accurate outside world recognition by combining two or more sensors and utilizing a feature of each sensor (see, for example, Patent Documents 1 to 3).

Figure 2:
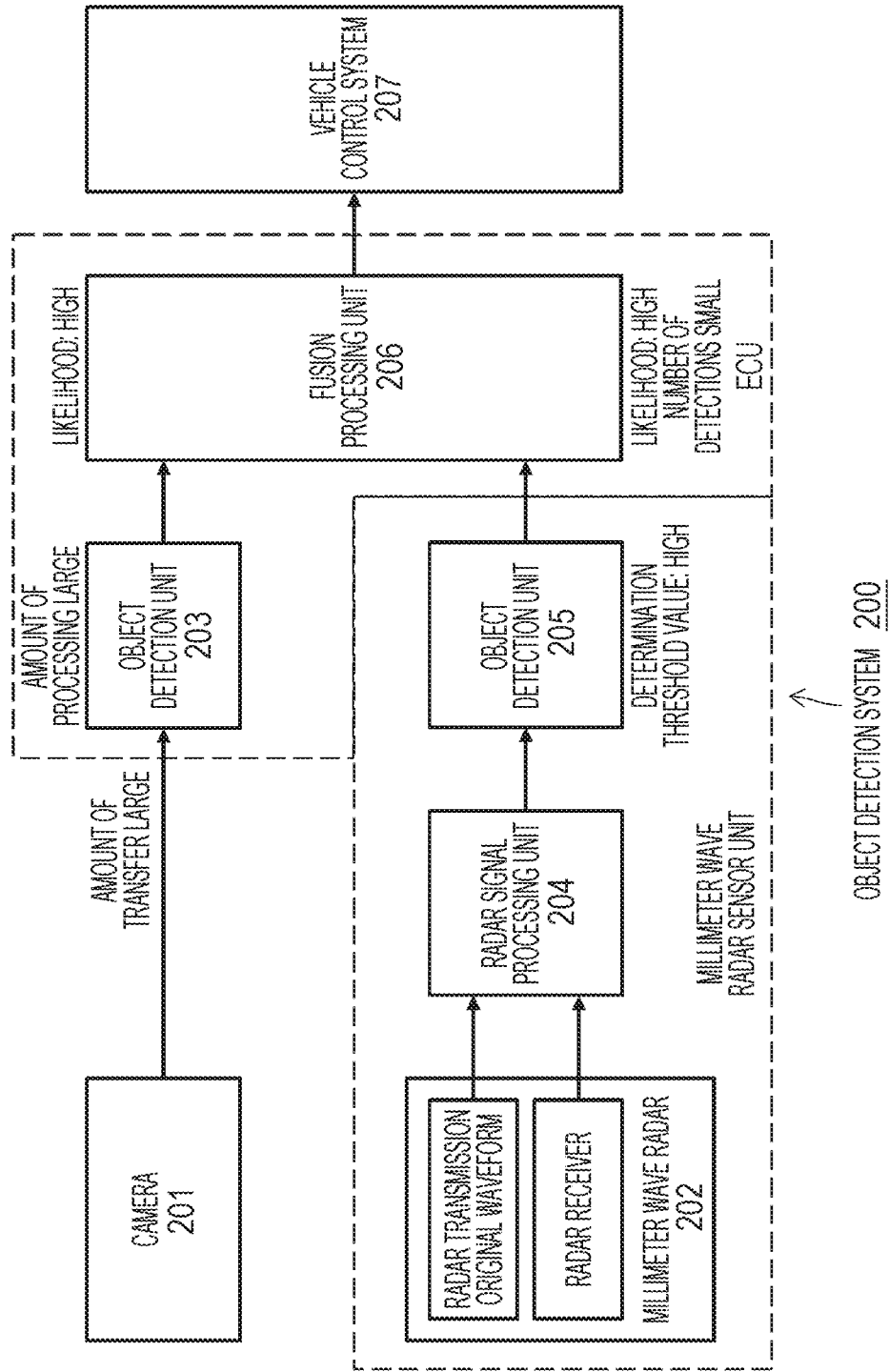
FIG. 2 is a diagram schematically illustrating a functional configuration of an object detection system 200.

FIG. 2 schematically illustrates a functional configuration of an object detection system 200 that performs object detection by fusing a camera 201 with a millimeter wave radar 202. It is assumed that the camera 201 and the millimeter wave radar 202 are both mounted on the same vehicle so that their capture ranges overlap each other.

A captured image by the camera 201 is subjected to development processing and then supplied to an object detection unit 203. The object detection unit 203 detects various objects such as a pedestrian, another vehicle, a lane, and others from the captured image on the basis of a predetermined image recognition algorithm, and outputs the detection result to a fusion processing unit 206 in the subsequent stage.

Furthermore, a radar signal processing unit 204 performs signal processing on original waveform data of transmitted radar waves by the millimeter wave radar 202, and a reception signal of a reflected wave of the transmitted radar waves by the millimeter wave radar 202, to measure a distance, direction, size, and speed of each object reflecting the radar waves. Then, an object detection unit 205 detects a position, speed, and size of each object on the basis of a signal processing result by the radar signal processing unit 204, and outputs the detection result to the fusion processing unit 206 in the subsequent stage.

The fusion processing unit 206 carries out fusion processing of information such as the position of the object detected by the object detection unit 203 from the captured image by the camera 201 with information such as the position, speed, and size of the object detected from the reception signal of the millimeter wave radar 202 by the object detection unit 205, to perform object determination processing. In a case where another outside world recognition sensor (not illustrated) is further mounted in the same vehicle, the fusion processing unit 206 may further perform fusion processing with a detection signal by the sensor. Then, the fusion processing unit 206 outputs an object determination result obtained by performing fusion processing to a vehicle control system 207.

On the basis of the object determination result in the fusion processing unit 207, the vehicle control system 207 carries out vehicle control for automatic driving or driving assistance, for example, adaptive cruise control (ACC), lane departure warning (LDW), lane keeping assist (LKA), automatic emergency braking (AEB), blind spot detection (BSD), and the like. Moreover, the vehicle control system 207 controls drive of each drive unit in the vehicle, such as ACL, a brake actuator (BRK), and a steering device (STR), for carrying out ACC, LDW, LKA, AEB, and BSD. For example, in a case where a road lane is recognized by the fusion processing unit 206, the vehicle control system performs traveling control of the vehicle, such as lane departure warning (LDW) or lane keeping assist (LKA), to prevent the vehicle from deviating from the lane. Furthermore, in a case where an obstacle such as another vehicle, a pedestrian, or a fence or signboard on the roadside is recognized by the fusion processing unit 206, the vehicle control system performs traveling control of the vehicle, such as lane keeping assist (LKA) or automatic emergency braking (AEB), to avoid collision of the vehicle with the obstacle.

Note that, the object detection unit 203 for the camera 201 is generally mounted in an Electronic Control Unit (ECU) of the vehicle together with the fusion processing unit 206. On the other hand, the signal processing unit 204 and the object detection unit 204 for the millimeter wave radar are generally mounted in a sensor unit of the millimeter wave radar 302.

Here, a difference is considered in the capture range and resolution between the camera 201 and the millimeter wave radar 202.

Figure 3:
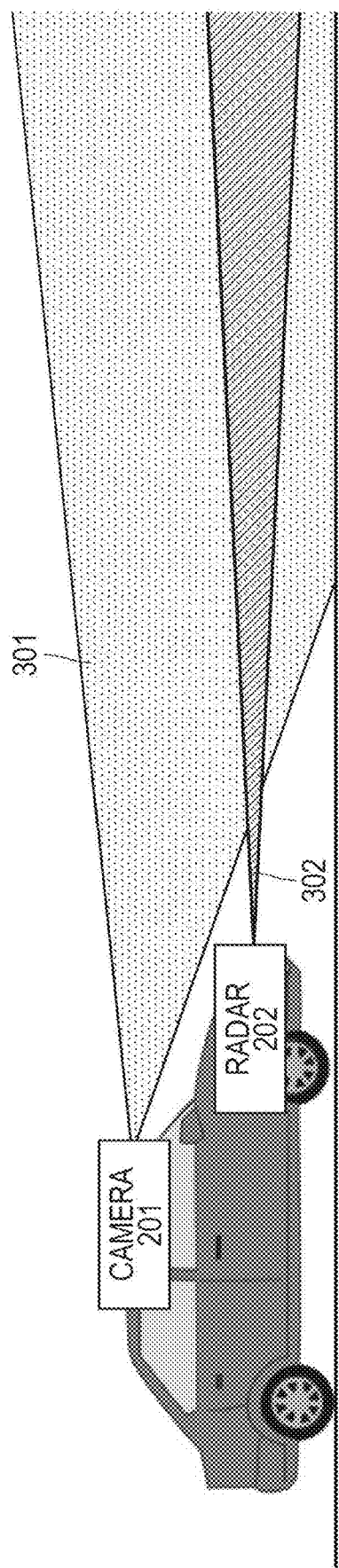
FIG. 3 is a diagram illustrating a state in which a camera 201 and a millimeter wave radar 202 are mounted on the same vehicle.

FIG. 3 illustrates a state in which the camera 201 and the millimeter wave radar 202 are mounted on the same vehicle, together with field of views (FOVs) 301 and 302 of the camera 201 and the millimeter wave radar 202. The camera 201 is installed near a rearview mirror or a roof so that the optical axis faces forward. Furthermore, the millimeter wave radar 202 is installed, for example, near a front bumper so that the irradiation direction of the radar faces forward. Furthermore, the field of view 302 of the millimeter wave radar 202 is narrower than the field of view 301 of the camera 201. However, in FIG. 3, the field of view of the camera 201 is set to 40 degrees.

Figure 4:
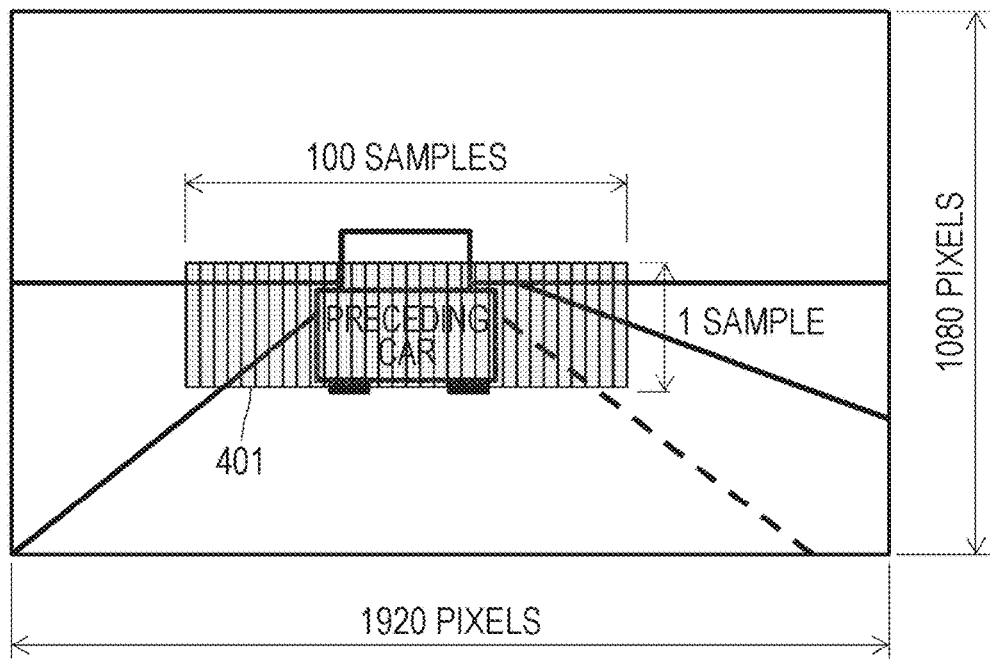
FIG. 4 is a diagram illustrating a capture range comparison between the camera 201 and the millimeter wave radar 202 (long range mode).
Figure 5:
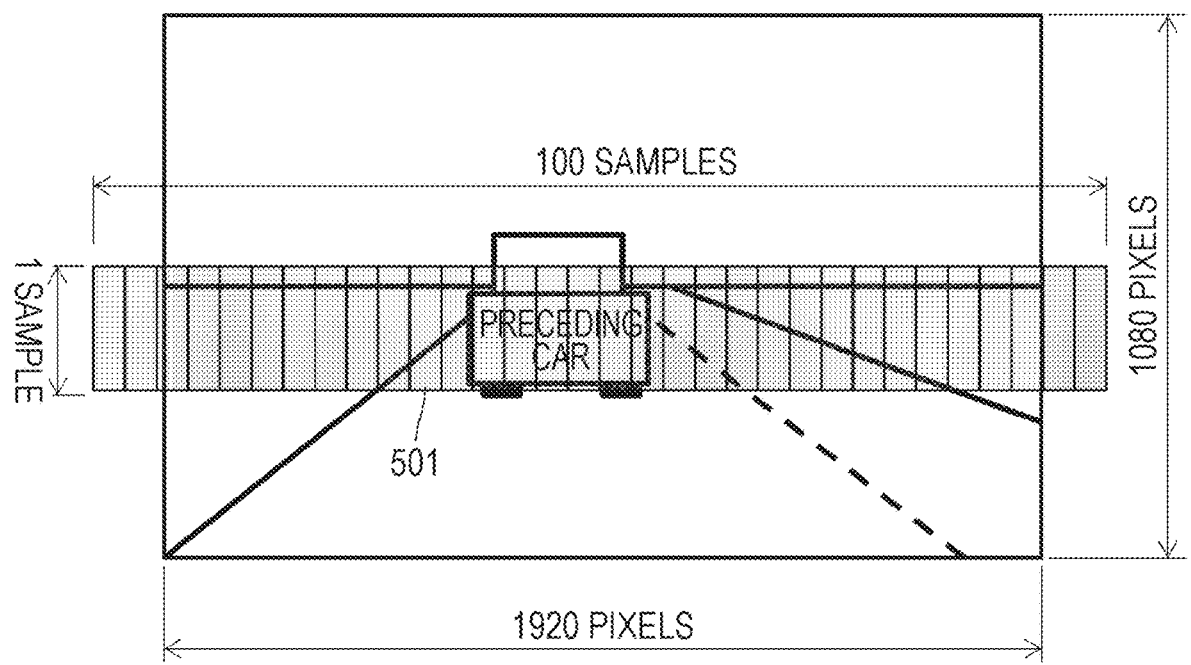
FIG. 5 is a diagram illustrating a capture range comparison between the camera 201 and the millimeter wave radar 202 (middle range mode).

FIGS. 4 and 5 each illustrate a captured image by the camera 201, on which the capture range of the millimeter wave radar 202 is superimposed. However, the resolution of the camera 201 is 1920×1080 pixels. Furthermore, FIG. 4 illustrates a capture range 401 of the millimeter wave radar 202 in a long range mode, and FIG. 5 illustrates a capture range 501 of the millimeter wave radar 202 in a middle range mode. Both of the capture ranges 401 and 501 of the millimeter wave radar 202 illustrated in respective modes are 1 sample in the vertical direction×100 samples in the horizontal direction.

As can be seen from FIGS. 4 and 5, the millimeter wave radar 202 has a lower resolution than the camera 201, and thus, the detection accuracy of the object detection unit 205 using the millimeter wave radar 202 is also low, and there is a concern that an erroneous determination is caused. For this reason, it is desirable that the vehicle control system 200 performs fusion with an object detection result by the camera 201 having a higher resolution. Note that, to prevent the erroneous determination, it is necessary to set a high determination threshold value for the object detection unit 205 to detect an object. If the determination threshold value is set high, a likelihood that a determination result of the object detection unit 205 is an object is high, but the number of detections is small.

On the other hand, as indicated in Table 1 above, the performance of the camera 201 may degrade in dark places such as at night and in bad weather, whereas the performance of the millimeter wave radar 202 can be kept without depending on conditions such as luminance and weather. Thus, it is desirable that the vehicle control system 200 fuses detection results of the camera 201 and the millimeter wave radar 202 together to maintain stable performance while compensating for each other's shortcomings.

However, in the object detection using the camera 201, when the object detection unit 203 attempts to detect an object by performing full screen scanning for each frame of the image captured by the camera 201, the image data for the full screen for each frame has to be transferred from the camera 201 to the object detection unit 203. In a design in which the object detection unit 203 for the camera 201 is mounted in the ECU on the vehicle side, an amount of data transfer between the camera 201 and the ECU is enormous. For example, when the resolution of the camera 201 is 1920×1080 pixels and the gradation for each RGB color is 8 bits, the transfer rate in a case where the frame rate is 30 frame per second (fps) is 14,929,920,000 bit per second (bps) as indicated below, which is enormous, and an amount of processing of the ECU (object detection unit 203) is also enormous.

$$1920 \times 1080 \times RGB\ (8\ bit \times 3) \times 30\ fps = 14{,}929{,}920{,}000\ bps \quad \text{[Expression 1]}$$

Furthermore, in a case where the object detection unit 203 performs full screen scanning of the captured image by the camera 201, detection processing is also performed in a portion where an object does not exist, so that the amount of processing of the ECU is enormous. For example, in the case of the captured image as illustrated in FIG. 4, even if it is sufficient to perform object detection of only a preceding vehicle traveling in front of the host vehicle, an entire area including a background and both sides of the road is processed, so that the amount of processing is enormous.

On the other hand, object identification information (object ID) and information on a relative direction, depth, and relative speed of the object for each object detected by the object detection unit 205 are transferred every frame, from the sensor unit of the millimeter wave radar 202 (see FIG. 2) to the ECU. Thus, in a case where the frame rate is 30 fps, the transfer rate between the sensor unit of the millimeter wave radar 202 and the ECU is n×1,920 bps (where n is the number of detected objects) as indicated below, and is much less than the amount of data transfer between the camera 201 and the ECU.

$$\text{Number of objects } n \times \text{object ID} \times \text{relative direction} \times \text{depth} \times \text{relative speed} \times 30\ \text{fps} = n \times 1{,}920\ \text{bps} \quad \text{[Expression 2]}$$

With reference to FIG. 6, a description will be given of a difference in the amount of data transfer to the ECU from each of the sensor unit of the millimeter wave radar 202 and the camera 201.

A captured image by the camera 201 is denoted by a reference numeral 600, and in a case where the object detection unit 203 performs full screen scanning, the entire image 600 is transferred to the ECU. In the captured image 600, only an area is required including a preceding vehicle 601 traveling in front of the host vehicle that can be an obstacle, and the other areas are useless.

Furthermore, a capture range of the millimeter wave radar 202 is denoted by a reference numeral 610. It is assumed that the captured image 600 by the camera 201 and the capture range 610 of the millimeter wave radar 202 have correspondence as illustrated in FIG. 3. A gray area indicated by a reference numeral 611 corresponds to the preceding vehicle detected by the object detection unit 205. Thus, an object ID regarding the detection area 611 and information on a relative direction, depth, and relative speed of the object are transferred from the object detection unit 205 (or the sensor unit of the millimeter wave radar 202) to the ECU at a predetermined frame rate.

In short, an amount of information transferred from the camera 201 to the ECU is large, but the information includes a lot of useless information. Information required in the captured image by the camera 201 is a vehicle, an obstacle, and the like, and most of the transferred information is useless. On the other hand, an amount of information transferred to the sensor unit of the millimeter wave radar 202 is small, and the detection accuracy of the depth and position of the object is high, but the detection accuracy regarding the size of the object is low because the resolution is low.

Thus, in this specification, as described below, an object detection system is devised that limits the amount of information transferred from the camera 201 to the ECU to reduce a processing load of the ECU (or the object detection unit 203) while maintaining the detection accuracy.

Figure 7:
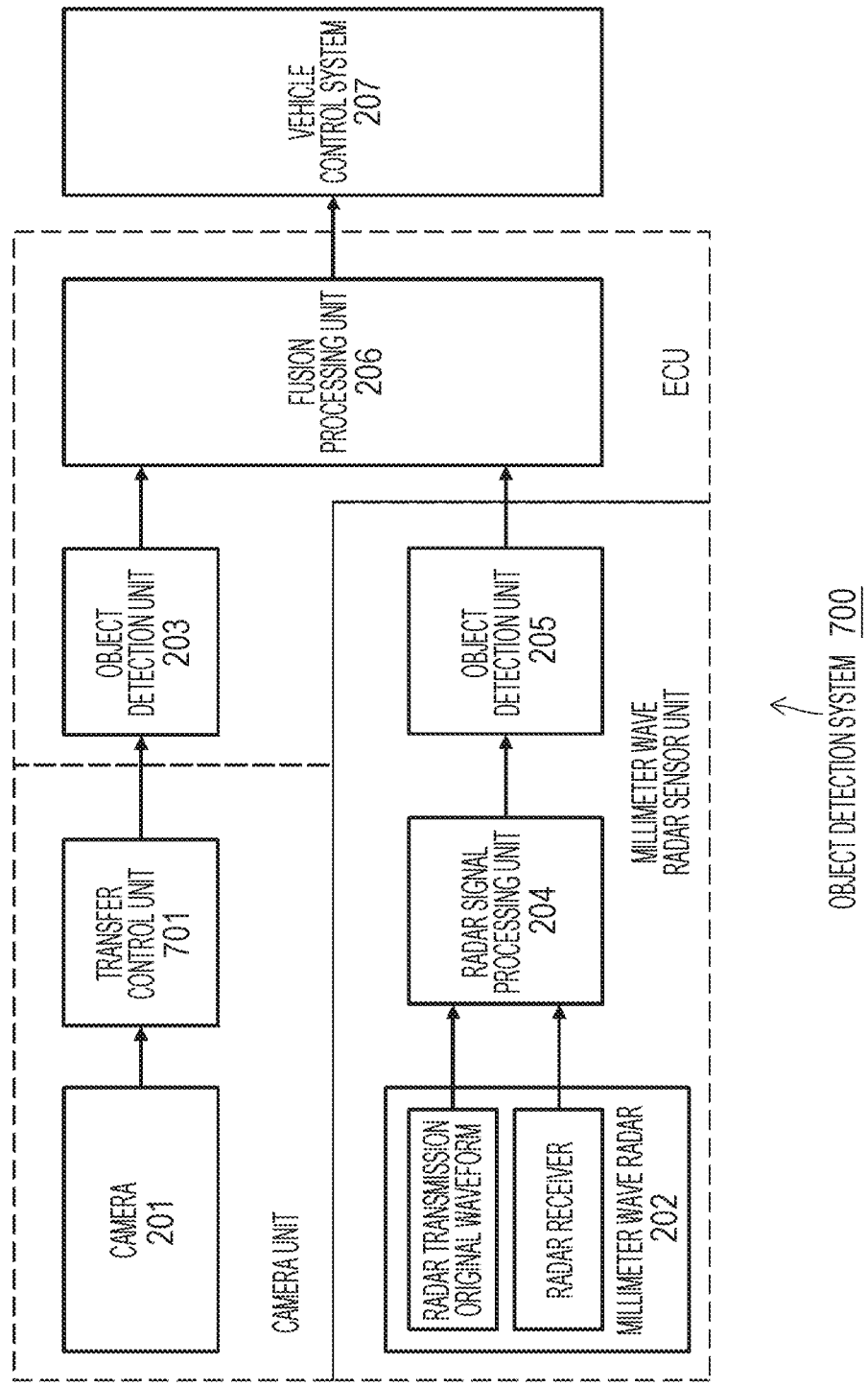
FIG. 7 is a diagram schematically illustrating a functional configuration of an object detection system 700.

FIG. 7 schematically illustrates a functional configuration of an object detection system 700 according to the devised system, the object detection system 700 being configured to limit the amount of information transferred from the camera 201 to the ECU. However, the same components as the object detection system 200 illustrated in FIG. 2 are indicated by the same reference numerals, and detailed description thereof will be omitted below.

A camera unit including the camera 201 includes a transfer control unit 701. The transfer control unit 701 intervenes between the camera 201 and the object detection unit 203, and controls information to be transferred from the camera 201 to the object detection unit 203. Specifically, the transfer control unit 701 determines a target area (region of interest (ROI)) in which an object is to be detected by the object detection unit 203 in a captured image by the camera 201, cuts out only image data of the ROI from the captured image after development processing, and outputs the image data to the object detection unit 203. The captured image by the camera 201 is mainly used for object detection, and is not used for the purpose of viewing (observation of a landscape by a driver or the like). Thus, image data other than that of ROI is unnecessary in which there is an extremely low possibility that an object such as an obstacle is detected.

Several methods can be conceivable for the transfer control unit 701 to determine the ROI from the captured image. For example, a position and size of the ROI can be determined on the basis of a position of an object detected by the object detection unit 204 using the millimeter wave radar 202. Alternatively, in a case where an outside world recognition sensor (not illustrated) other than the millimeter wave radar 202 is mounted on the same vehicle, the position and size of the ROI can be determined by using an object detection result based on an output of the sensor.

Furthermore, the transfer control unit 701 may determine the ROI by using an empirical rule, a learned result, or the like on the basis of map information or a recent object detection result in the object detection unit 203. Of course, a user such as a vehicle driver may instruct information regarding the position and size of the ROI on the basis of voice input or the like.

The transfer control unit 701 limits the image to be transferred to the object detection unit 203 in the subsequent stage to that of the ROI, whereby the amount of data transfer between the camera 201 and the ECU can be reduced as compared to a case (described above) where the entire captured image by the camera 201 is transferred. Further-more, the amount of processing of the object detection unit 203 or the ECU can be reduced by the amount of the reduction of the amount of data transfer.

The object detection unit 203 detects various objects such as a pedestrian, another vehicle, a lane, and others from the image data of the ROI received from the transfer control unit 701 on the basis of a predetermined image recognition algorithm, and outputs the detection result to the fusion processing unit 206 in the subsequent stage.

Furthermore, the radar signal processing unit 204 performs signal processing on original waveform data of transmitted radar waves by the millimeter wave radar 202, and a reception signal of a reflected wave of the transmitted radar waves by the millimeter wave radar 202, to measure a distance, direction, size (angle), and speed of each object reflecting the radar waves. Then, the object detection unit 205 detects a position, speed, and size of each object on the basis of a signal processing result by the radar signal processing unit 204, and outputs the detection result to the fusion processing unit 206 in the subsequent stage.

The fusion processing unit 206 carries out fusion processing of information such as the position of the object detected by the object detection unit 203 from the captured image by the camera 201 with information such as the position, speed, and size of the object detected from the reception signal of the millimeter wave radar 202 by the object detection unit 205, to perform object determination processing. In a case where another outside world recognition sensor (not illustrated) is further mounted in the same vehicle, the fusion processing unit 206 may further perform fusion processing with a detection signal by the sensor. Then, the fusion processing unit 206 outputs an object determination result obtained by performing fusion processing to the vehicle control system 207.

Example 1

Figure 8:
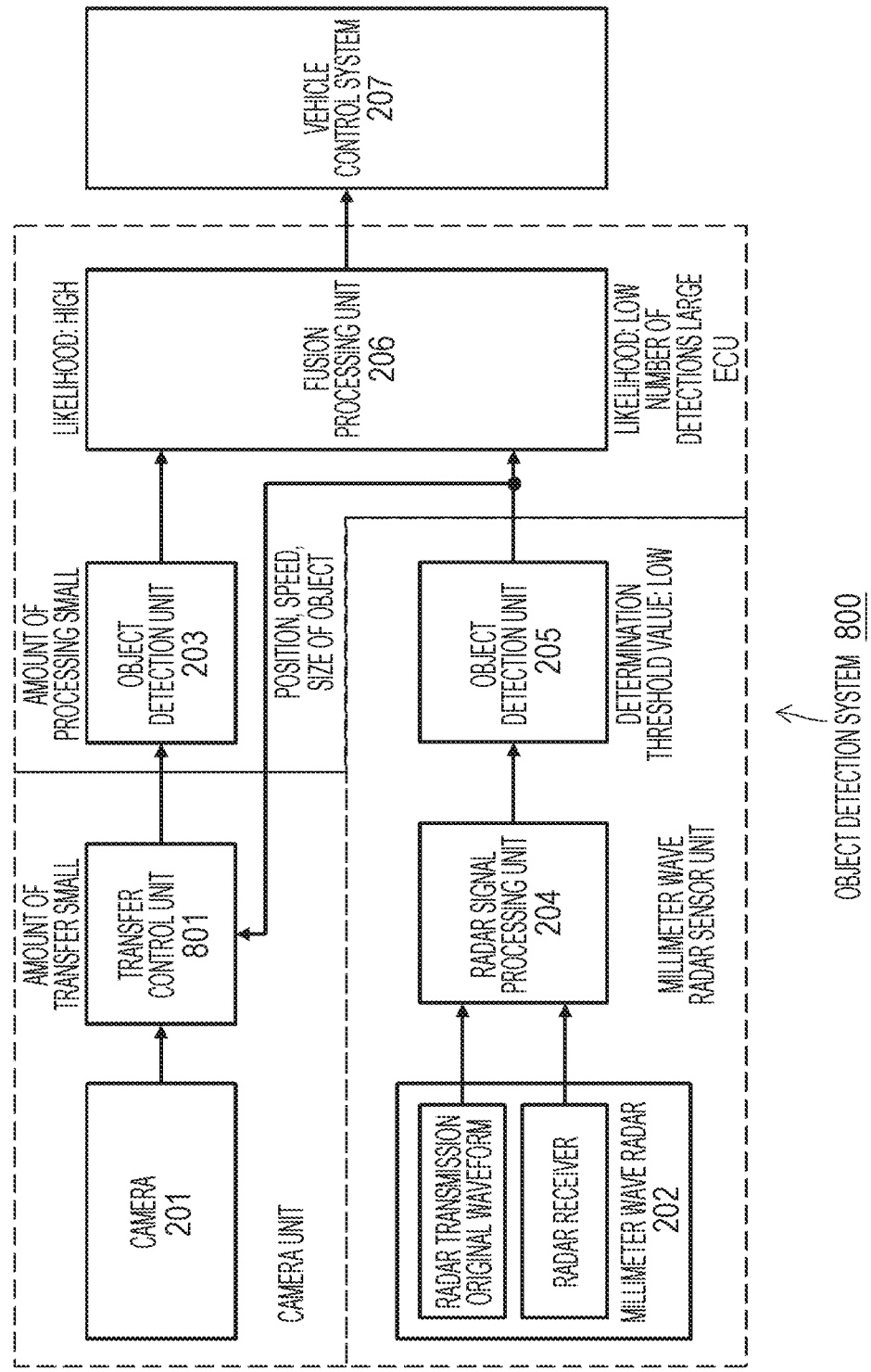
FIG. 8 is a diagram schematically illustrating a functional configuration of an object detection system 800.

FIG. 8 schematically illustrates a functional configuration of an object detection system 800 configured to limit the amount of information transferred from the camera 201 to the ECU by determining a position and size of the ROI by using a detection result of the outside world recognition sensor other than the camera 201. However, the same components as the object detection system 200 illustrated in FIG. 2 are indicated by the same reference numerals, and detailed description thereof will be omitted below.

The radar signal processing unit 204 performs signal processing on original waveform data of transmitted radar waves by the millimeter wave radar 202, and a reception signal of a reflected wave of the transmitted radar waves by the millimeter wave radar 202, to measure a distance, direction, size, and speed of each object reflecting the radar waves. Next, the object detection unit 205 detects a position, speed, and size of each object on the basis of a signal processing result by the radar signal processing unit 204. Then, an object ID and information on the position, speed, and size of the object for each object detected by the object detection unit 205 are transferred every frame from the sensor unit of the millimeter wave radar 202 to the ECU.

A transfer control unit 801 receives, from the ECU, the information on the position, speed, and size of each object detected by the sensor unit of the millimeter wave radar 202, and determines a position and size of the ROI. Then, the transfer control unit 801 cuts out only image data of the ROI from the captured image after development processing, and outputs the image data to the object detection unit 203 in the ECU.

The object detection unit 203 detects various objects such as a pedestrian, another vehicle, a lane, and others from the image data of the ROI received from the transfer control unit 801 on the basis of a predetermined image recognition algorithm, and outputs the detection result to the fusion processing unit 206 in the subsequent stage.

The fusion processing unit 206 carries out fusion processing of information such as the position of the object detected by the object detection unit 203 from the captured image by the camera 201 with information such as the position, speed, and size of the object detected from the reception signal of the millimeter wave radar 202 by the object detection unit 205, to perform object determination processing. In a case where another outside world recognition sensor (not illustrated) is further mounted in the same vehicle, the fusion processing unit 206 may further perform fusion processing with a detection signal by the sensor. Then, the fusion processing unit 206 outputs an object determination result obtained by performing fusion processing to the vehicle control system 207.

As illustrated in FIG. 8, the transfer control unit 801 limits the image data to be transferred to the object detection unit 203 in the subsequent stage to that of the ROI, whereby the amount of data transfer between the camera 201 and the ECU can be reduced as compared to the case (described above) where the entire captured image by the camera 201 is transferred. Furthermore, the amount of processing of the object detection unit 203 or the ECU can be reduced by the amount of the reduction of the amount of data transfer.

Note that, in the configuration example of the object detection system 800 illustrated in FIG. 8, the transfer control unit 801 is configured to receive the detection result (information such as the position, speed, and size of the object) of the millimeter wave radar 202 via the ECU. This also depends on, for example, the convenience of a design in which, with respect to the ECU, the camera unit on the camera 201 side and the millimeter wave radar sensor unit on the millimeter wave radar 202 side are individually connected to the ECU, and there is no communication means between the camera unit and the millimeter wave radar sensor unit. For example, it is also possible to configure the object detection system 800 so that the transfer control unit 801 receives information directly from the object detection unit 205.

Figure 9:
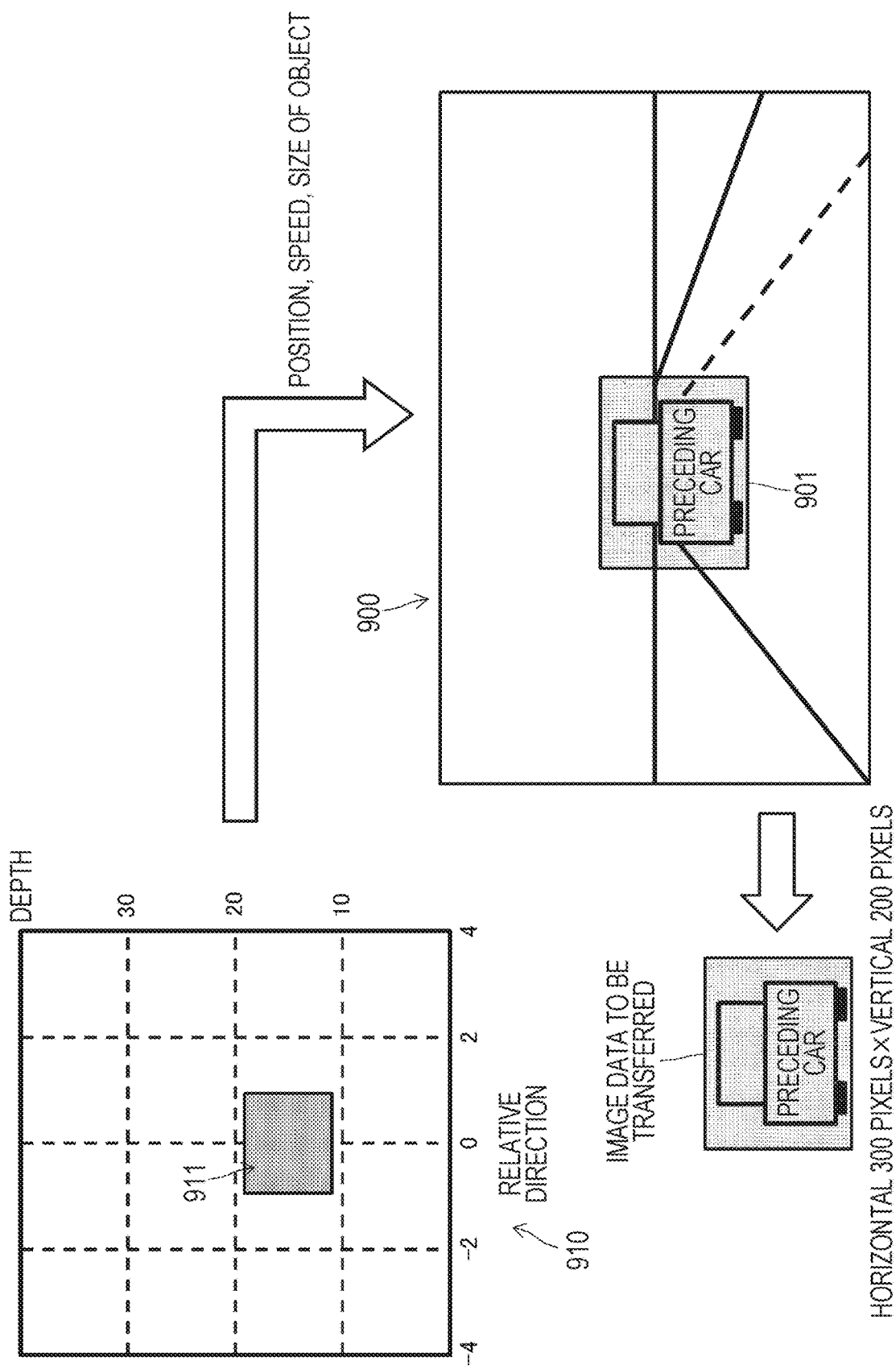
FIG. 9 is a diagram for explaining a mechanism for controlling transfer of a captured image by the camera 201 on the basis of a detection result of the millimeter wave radar 202.

With reference to FIG. 9, a description will be given of a mechanism by which the transfer control unit 801 limits the image transferred to the object detection unit 203 to the ROI on the basis of the detection result of the millimeter wave radar 202, in the object detection system 800 illustrated in FIG. 8.

A captured image by the camera 201 is denoted by a reference numeral 900. In the captured image 900, only an ROI is required including a preceding vehicle traveling in front of the host vehicle that is indicated by a reference numeral 901, and the other areas are useless.

Furthermore, a capture range of the millimeter wave radar 202 is denoted by a reference numeral 910. It is assumed that the captured image 900 by the camera 201 and the capture range 910 of the millimeter wave radar 202 have correspondence as illustrated in FIG. 3. A gray area indicated by a reference numeral 911 corresponds to the preceding vehicle detected by the object detection unit 205.

An object ID regarding the detection area 611 and information on a relative direction, depth, and relative speed of the object are transferred from the object detection unit 205 to the ECU at a predetermined frame rate. Furthermore, in the object detection system 800, the object ID and information on a position, speed, and size of the object are transmitted to the transfer control unit 801 via the ECU.

In the example illustrated in FIG. 9, the information such as the position, speed, and size of an object (object ID: 1) indicated by the reference numeral 911, that is, the preceding vehicle is transmitted from the ECU to the transfer control unit 801. Then, the transfer control unit 801 determines the position and size of the ROI on the basis of the information such as the position, speed, and size received. The transfer control unit 801 cuts out only image data of the ROI 901 from the captured image 900 after development processing, and outputs the image data to the object detection unit 203. Here, when the size of the ROI 901 determined by the transfer control unit 801 is horizontal 300 pixels×vertical 200 pixels and the gradation for each RGB color is 8 bits, the transfer rate in a case where the frame rate is 30 fps is 4,320,000 bps as indicated below, which is much smaller amount of transfer than 14,929,920,000 bps in a case where the entire captured image is transferred.

$$300 \times 200 \times RGB \ (8 \ bit \times 3) \times 30 \ fps = 4{,}320{,}000 \ bps \qquad [\text{Expression 3}]$$

As descried above, the transfer control unit 801 limits the image to be transferred to the object detection unit 203 in the subsequent stage to that of the ROI, whereby the amount of data transfer between the camera 201 and the ECU can be reduced as compared to the case (described above) where the entire captured image by the camera 201 is transferred. Furthermore, the amount of processing of the object detection unit 203 or the ECU can be reduced by the amount of the reduction of the amount of data transfer.

In the object detection system 200 illustrated in FIG. 2, since full-screen image data is transferred every frame from the camera 201 to the object detection unit 203, that is, the ECU, the amount of transfer is large, and the amount of processing in the object detection unit 203 is large accordingly. Furthermore, in the sensor unit of the millimeter wave radar 202, it is necessary to increase the determination threshold value of the object detection unit 205 and output only the detection result having a high likelihood to the ECU, and the number of detected objects is small. On the other hand, in the object detection system 800 illustrated in FIG. 8, since the image data is transferred to the ECU only for the ROI in the captured image by the camera 201, the amount of transfer is small, and the amount of processing in the object detection unit 203 is reduced accordingly. Furthermore, in the sensor unit of the millimeter wave radar 202, the determination threshold value of the object detection unit 205 can be set low to increase the number of object detections to be output to the ECU. As a result, the ECU is notified of objects having a low likelihood, but in the fusion processing unit 206, fusion is performed with the detection result having a high likelihood using the captured image by the camera 201, whereby the number of detected objects can be increased and the likelihood of the detected object can be increased.

Table 2 summarizes performance comparison results in a case where object detection is performed by using each of the camera 201 and the millimeter wave radar 202 alone, and in a case where object detection is performed by performing fusion processing of the detection results of the camera 201 and millimeter wave radar 202 in the object detection system 800. In the table, ○ indicates high performance (having good accuracy), Δ indicates low performance (accuracy is insufficient), and × indicates undetectable.

TABLE 2

| | Camera | Millimeter Wave Radar | Object Detection System |
|---|---|---|---|
| Distance Measurement (Depth) | X | ○ | ○ |
| Hardness of Object | X | ○ | ○ |
| Relative Speed of Object | X | ○ | ○ |
| Horizontal Resolution | ○ | X | ○ |
| Vertical Resolution | ○ | X | ○ |
| Amount of Data Transfer | X | ○ | ○ |
| Amount of Detection Processing | X | ○ | ○ |
| Object Recognition Accuracy by Itself | ○ | Δ | ○ |
| Stability (Amount of Light: Dark Scene) | Δ | ○ | ○ |
| Stability (Weather: Fog/Rain and the Like) | X | ○ | ○ |

From Table 2 above, it can be seen that high object detection performance can be stably obtained for all items with the object detection system 800.

Furthermore, comparing the camera 201 and the millimeter wave radar 202, the millimeter wave radar 202 is inferior in terms of resolution, but can stably obtain detection performance even under bad conditions such as bad weather and dark places. On the other hand, the camera 201 is superior in terms of resolution, but has a problem that the amount of data is large and the performance is significantly degraded under bad conditions such as bad weather and dark places.

Thus, the determination threshold value in the object detection unit 205 of the millimeter wave radar 202 may be adjusted depending on an imaging condition of the camera 201 so that stable object determination performance is obtained in the fusion processing unit 206 regardless of fluctuation of the imaging condition.

Example 2

In a case where the imaging condition of the camera 201 is good, the determination threshold value of the object detection unit 205 is lowered. When the determination threshold value is lowered, the object detection unit 205 detects an object having a low likelihood as an object, so that the number of detections increases. As a result, more objects are detected on the basis of the detection result of the millimeter wave radar 202 and erroneous detection is included, but the object detection unit 203 can detect more objects on the basis of the captured image by the camera 201 and remove the erroneous detection.

On the other hand, in a case where the imaging condition of the camera 201 is not good, it becomes difficult for the object detection unit 203 to compensate the detection accuracy, so the determination threshold value of the object detection unit 205 is increased. When the determination threshold value is increased, the object detection unit 205 detects only an object having a high likelihood as an object, so that the number of detections decreases. As a result, the erroneous detection is prevented of the object based on the detection result of the millimeter wave radar 202, and high detection performance is maintained. Furthermore, the object detection result is not used of the object detection unit 203 based on the captured image by the camera 201.

Figure 10:
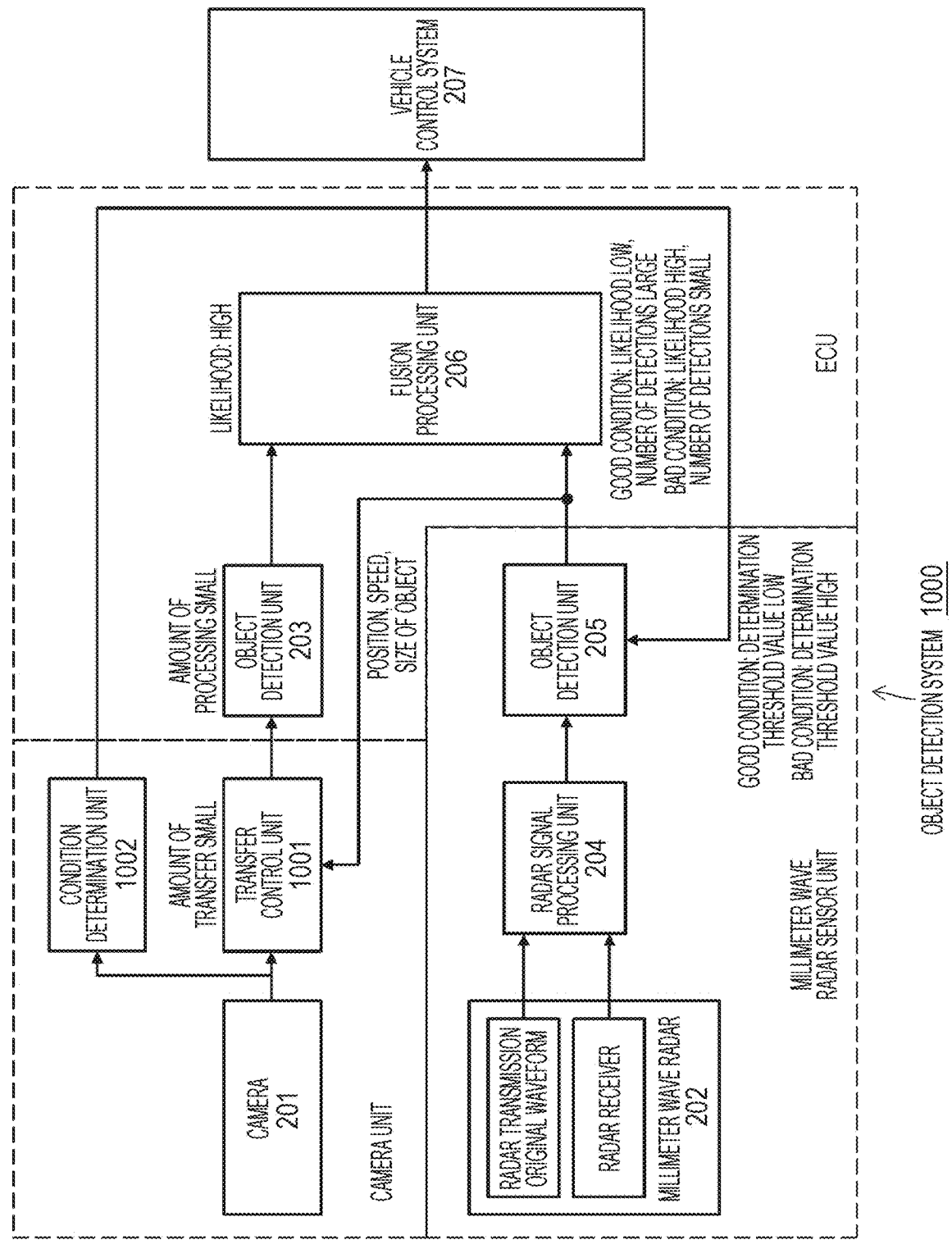
FIG. 10 is a diagram illustrating a functional configuration of an object detection system 1000.

FIG. 10 schematically illustrates a functional configuration of an object detection system 1000 including a mechanism for adjusting the determination threshold value of the object detection based on the detection result of the millimeter wave radar 202 depending on the imaging condition of the camera 201. However, it is assumed that the object detection system 1000 includes a mechanism for determining the ROI in the captured image by using the detection result of the millimeter wave radar 202, and controlling the transfer of the image data to the ECU, similarly to the object detection system 800 illustrated in FIG. 8. Furthermore, in FIG. 10, the same components as the object detection system 200 illustrated in FIG. 2 are indicated by the same reference numerals, and detailed description thereof will be omitted below.

The captured image by the camera 201 is subjected to development processing and then supplied to a transfer control unit 1001 and a condition determination unit 1002. The condition determination unit 1002 analyzes the captured image and determines whether or not the imaging condition is good on the basis of, for example, the luminance contrast or the like. Alternatively, the condition determination unit 1002 may determine whether or not the imaging condition is good on the basis of a detection result of the environmental sensor (in the data acquisition unit 102), or the like, regardless of the captured image. Alternatively, the condition determination unit 1002 may determine whether or not the imaging condition is good on the basis of a weather forecast or the like acquired from the outside via the Internet or the like.

The radar signal processing unit 204 performs signal processing on original waveform data of transmitted radar waves by the millimeter wave radar 202, and a reception signal of a reflected wave of the transmitted radar waves by the millimeter wave radar 202, to measure a distance, direction, size, and speed of each object reflecting the radar waves.

The object detection unit 205 detects a position, speed, and size of each object on the basis of a signal processing result by the radar signal processing unit 204. Here, when determining the object, the object detection unit 205 adjusts the determination threshold value on the basis of the imaging condition determined by the condition determination unit 1002. In a case where the imaging condition of the camera 201 is good, the determination threshold value of the object detection unit 205 is lowered. As a result, more objects are detected on the basis of the detection result of the millimeter wave radar 202 and erroneous detection is included, but the object detection unit 203 can detect more objects on the basis of the captured image by the camera 201 and remove the erroneous detection. On the other hand, in a case where the imaging condition of the camera 201 is not good, the determination threshold value of the object detection unit 205 is increased. As a result, the erroneous detection is prevented of the object based on the detection result of the millimeter wave radar 202, and high detection performance is maintained. Then, an object ID and information on the position, speed, and size of the object for each object detected by the object detection unit 205 are transferred every frame from the sensor unit of the millimeter wave radar 202 to the ECU.

Furthermore, the transfer control unit 1001 receives the information on the position, speed, and size of each object detected by the sensor unit of the millimeter wave radar 202 via the ECU, and determines a position and size of the ROI. Then, the transfer control unit 1001 cuts out only image data of the ROI from the captured image after development processing, and outputs the image data to the object detection unit 203 in the ECU. The object detection unit 203 detects various objects such as a pedestrian, another vehicle, a lane, and others from the image data of the ROI received from the transfer control unit 1001 on the basis of a predetermined image recognition algorithm, and outputs the detection result to the fusion processing unit 206 in the subsequent stage.

The fusion processing unit 206 carries out fusion processing of information such as the position of the object detected by the object detection unit 203 from the captured image by the camera 201 with information such as the position, speed, and size of the object detected from the reception signal of the millimeter wave radar 202 by the object detection unit 205, to perform object determination processing. In a case where another outside world recognition sensor (not illustrated) is further mounted in the same vehicle, the fusion processing unit 206 may further perform fusion processing with a detection signal by the sensor. Then, the fusion processing unit 206 outputs an object determination result obtained by performing fusion processing to the vehicle control system 207.

In the object detection system 200 illustrated in FIG. 2, since full-screen image data is transferred every frame from the camera 201 to the object detection unit 203, that is, the ECU, the amount of transfer is large, and the amount of processing in the object detection unit 203 is large accordingly. Furthermore, in the sensor unit of the millimeter wave radar 202, it is necessary to increase the determination threshold value of the object detection unit 205 and output only the detection result having a high likelihood to the ECU, and the number of detected objects is small. On the other hand, in the object detection system 1000 illustrated in FIG. 10, since the image data is transferred to the ECU only for the ROI in the captured image by the camera 201, the amount of transfer is small, and the amount of processing in the object detection unit 203 is reduced accordingly. Furthermore, when the imaging condition of the camera 201 is good, in the sensor unit of the millimeter wave radar 202, the determination threshold value of the object detection unit 205 can be set low to increase the number of object detections to be output to the ECU. As a result, the ECU is notified of objects having a low likelihood, but in the fusion processing unit 206, fusion is performed with the detection result having a high likelihood using the captured image by the camera 201, whereby the likelihood can be increased. Furthermore, when the imaging condition of the camera 201 is not good, to prevent the erroneous detection, in the sensor unit of the millimeter wave radar 202, it is necessary to increase the determination threshold value of the object detection unit 205 and output only the detection result having a high likelihood to the ECU, and the number of detected objects is reduced. Furthermore, when the imaging condition of the camera 201 is not good, the fusion processing unit 206 does not use the object detection result of the object detection unit 203 based on the captured image by the camera 201.

Example 3

The millimeter wave radar 202 is based on a principle of detecting an object on the basis of a reflected wave of a radiated radio wave. Thus, there is a tendency that an intensity of the reflected wave from a vehicle including a large metal body is strong, but an intensity of the reflected wave from a small vehicle such as a motorcycle is slightly weakened, and the reflected wave from a non-metal object such as a person or an animal is even weaker. Thus, a size of an ROI cut out from the captured image by the camera 201 may be determined on the basis of an intensity of a detection signal in the millimeter wave radar 202. By determining an appropriate ROI size, it is possible to cut out and transfer an image of an object from the captured image without loss without losing a part of the object, and it is possible to prevent that even a useless image portion is cut out and the amount of data transfer and the amount of processing are increased unnecessarily.

Figure 11:
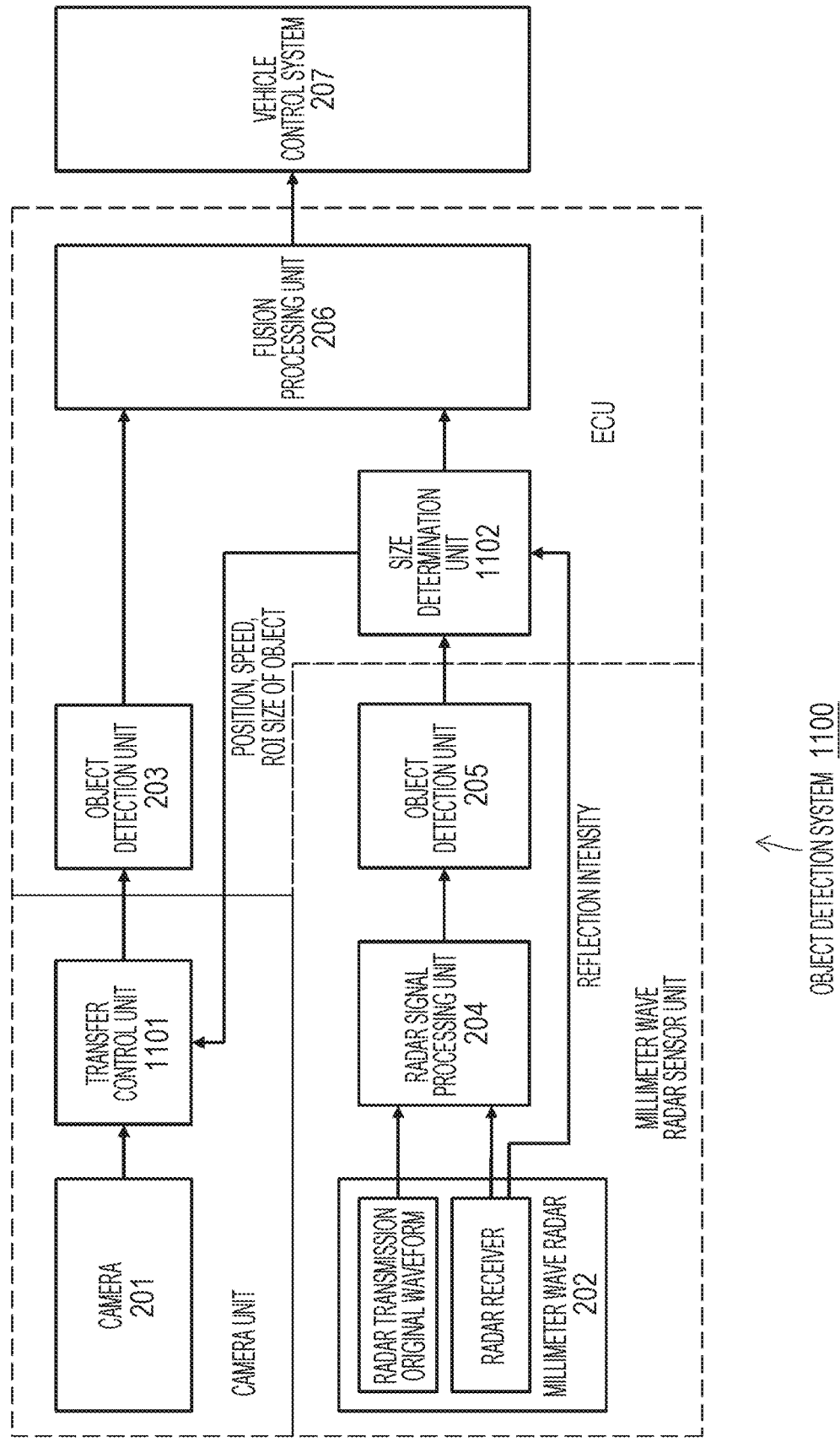
FIG. 11 is a diagram illustrating a functional configuration of an object detection system 1100 including a mechanism for determining a size of an ROI.

FIG. 11 schematically illustrates a functional configuration of an object detection system 1100 including a mechanism for determining the size of the ROI. However, it is assumed that the object detection system 1100 includes a mechanism for determining the ROI in the captured image by using the detection result of the millimeter wave radar 202, and controlling the transfer of the image data to the ECU, similarly to the object detection system 800 illustrated in FIG. 8. Furthermore, in FIG. 11, the same components as the object detection system 200 illustrated in FIG. 2 are indicated by the same reference numerals, and detailed description thereof will be omitted below.

The radar signal processing unit 204 performs signal processing on original waveform data of transmitted radar waves by the millimeter wave radar 202, and a reception signal of a reflected wave of the transmitted radar waves by the millimeter wave radar 202, to measure a distance, direction, size, and speed of each object reflecting the radar waves. Next, the object detection unit 205 detects a position, speed, and size of each object on the basis of a signal processing result by the radar signal processing unit 204. Then, an object ID and information on the position, speed, and size of the object for each object detected by the object detection unit 205 are transferred every frame from the sensor unit of the millimeter wave radar 202 to the ECU.

In the ECU, a size determination unit 1102 determines the size of the ROI on the basis of the intensity of the reflected wave detected by the millimeter wave radar 202. Note that, it is assumed that the size determination unit 1102 outputs an output of the object detection unit 205 as it is to the fusion processing unit 206 in the subsequent stage. A transfer control unit 1101 receives, from the ECU, the information on the position, speed, and size of each object detected by the sensor unit of the millimeter wave radar 202, and the information on the size of the ROI determined by the size determination unit 1102. Then, the transfer control unit 1101 cuts out only image data of the ROI having the size designated by the size determination unit 1102 from the captured image after development processing, and outputs the image data to the object detection unit 203 in the ECU.

The object detection unit 203 detects various objects such as a pedestrian, another vehicle, a lane, and others from the image data of the ROI received from the transfer control unit 1101 on the basis of a predetermined image recognition algorithm, and outputs the detection result to the fusion processing unit 206 in the subsequent stage.

The fusion processing unit 206 carries out fusion processing of information such as the position of the object detected by the object detection unit 203 from the captured image by the camera 201 with information such as the position, speed, and size of the object detected from the reception signal of the millimeter wave radar 202 by the object detection unit 205, to perform object determination processing. In a case where another outside world recognition sensor (not illustrated) is further mounted in the same vehicle, the fusion processing unit 206 may further perform fusion processing with a detection signal by the sensor. Then, the fusion processing unit 206 outputs an object determination result obtained by performing fusion processing to the vehicle control system 207.

Figure 12:
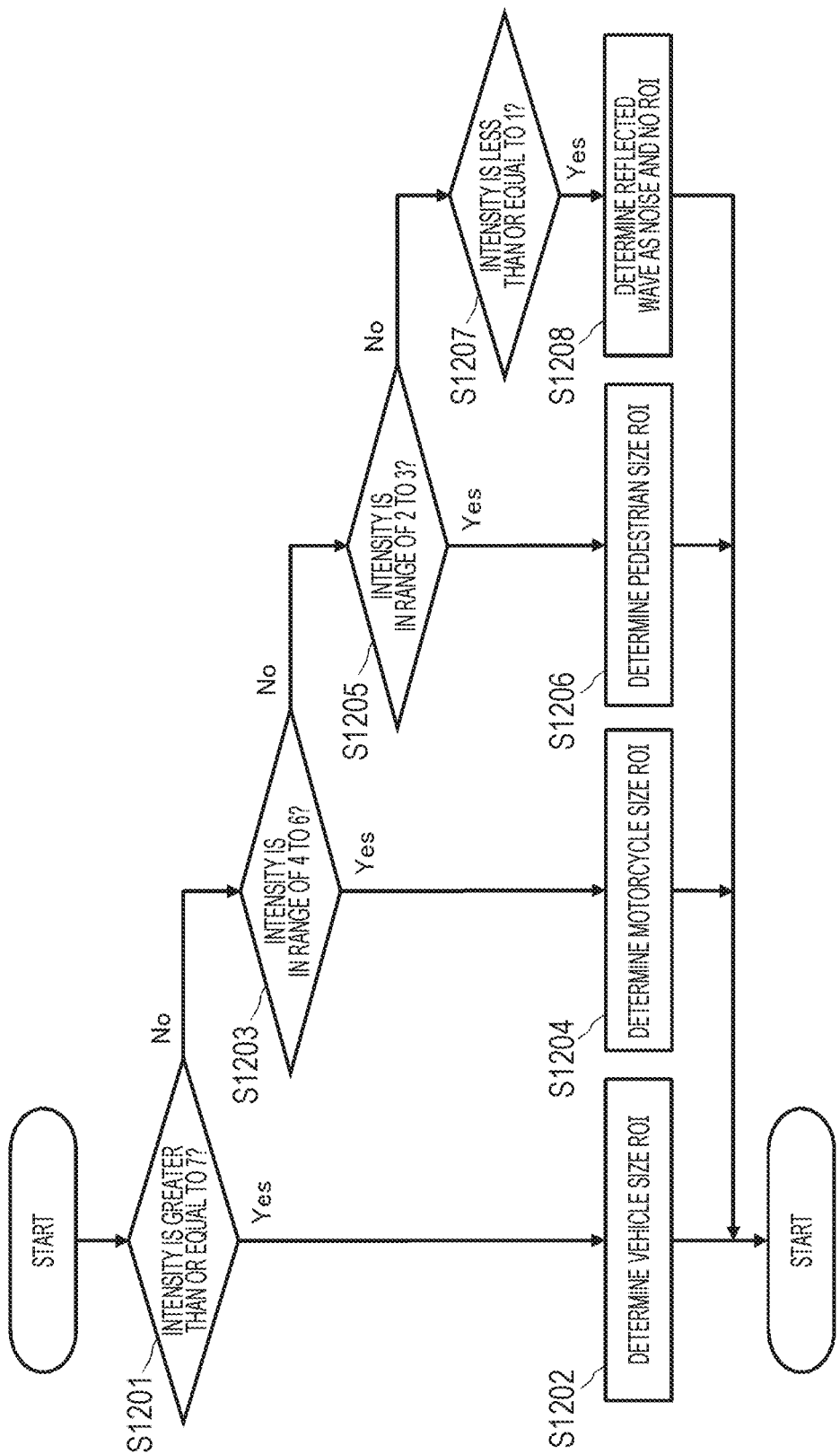
FIG. 12 is a flowchart illustrating a processing procedure for determining the size of the ROI on the basis of a reflection intensity of radar waves in a size determination unit 1102.

FIG. 12 illustrates a processing procedure for determining the size of the ROI on the basis of a reflection intensity of radar waves in the size determination unit 1102 in the form of a flowchart. However, for convenience of explanation, the reflection intensity of the radar waves is treated at 10 levels of intensity from 0 to 9.

The size determination unit 1102 checks a level of the reflection intensity of the radar waves. Then, if the level of the reflection intensity of the radar waves is greater than or equal to 7 (Yes in step S1201), the size determination unit 1102 estimates that the object detected by the object detection unit 205 is a vehicle, and determines a vehicle size ROI (step S1202), outputs the vehicle size ROI, and ends this processing.

Furthermore, if the level of the reflection intensity of the radar waves is in a range of 4 to 6 (Yes in step S1203), the size determination unit 1102 estimates that the object detected by the object detection unit 205 is a motorcycle, and determines a motorcycle size ROI (step S1204), outputs the motorcycle-size ROI, and ends this processing.

Furthermore, if the level of the reflection intensity of the radar waves is in a range of 2 to 3 (Yes in step S1205), the size determination unit 1102 estimates that the object detected by the object detection unit 205 is a pedestrian, and determines a pedestrian size ROI (step S1206), outputs the pedestrian size ROI, and ends this processing.

Furthermore, if the level of the reflection intensity of the radar waves is less than or equal to 1 (Yes in step S1207), the size determination unit 1102 determines that the reflected wave is noise and determines that there is no ROI (step S1208), and ends this processing.

Note that, in the case of an object detection system that uses LiDAR together with the camera 201 instead of the millimeter wave radar 202, the system can be built to determine the size of the ROI on the basis of, for example, an intensity of reflected light with respect to an irradiation laser.

Example 4

In the object detection system 800 illustrated in FIG. 8, in a case where the object detection unit 205 detects a large number of objects from the detection result of the millimeter wave radar 202, if the transfer control unit 801 extracts all the detected objects as ROIs, the amount of transfer to the object detection unit 203, that is, the ECU increases, and the amount of processing in the ECU also increases. Thus, the transfer control unit 801 may set an upper limit on the number of ROIs to be cut out and transferred from the captured image by the camera 201 so that the amount of transfer to the ECU and the amount of processing of the ECU do not increase to greater than or equal to predetermined values.

Furthermore, it is preferable to preferentially transfer image data of an important ROI and suppress transfer of image data of an unimportant ROI. In the case of an object detection system mounted on and used in a vehicle, it can be said that an ROI including an obstacle having a possibility of collision is important from a viewpoint of collision avoidance. Specifically, an object existing in front of a vehicle has a possibility of collision when the vehicle travels forward, so an ROI including such an object is important. Furthermore, an object having a positive relative speed is moving away from the host vehicle and has a low possibility of collision, but an object having a negative relative speed is approaching the host vehicle and has a high possibility of collision, so an ROI including the latter object is important.

Figure 13:
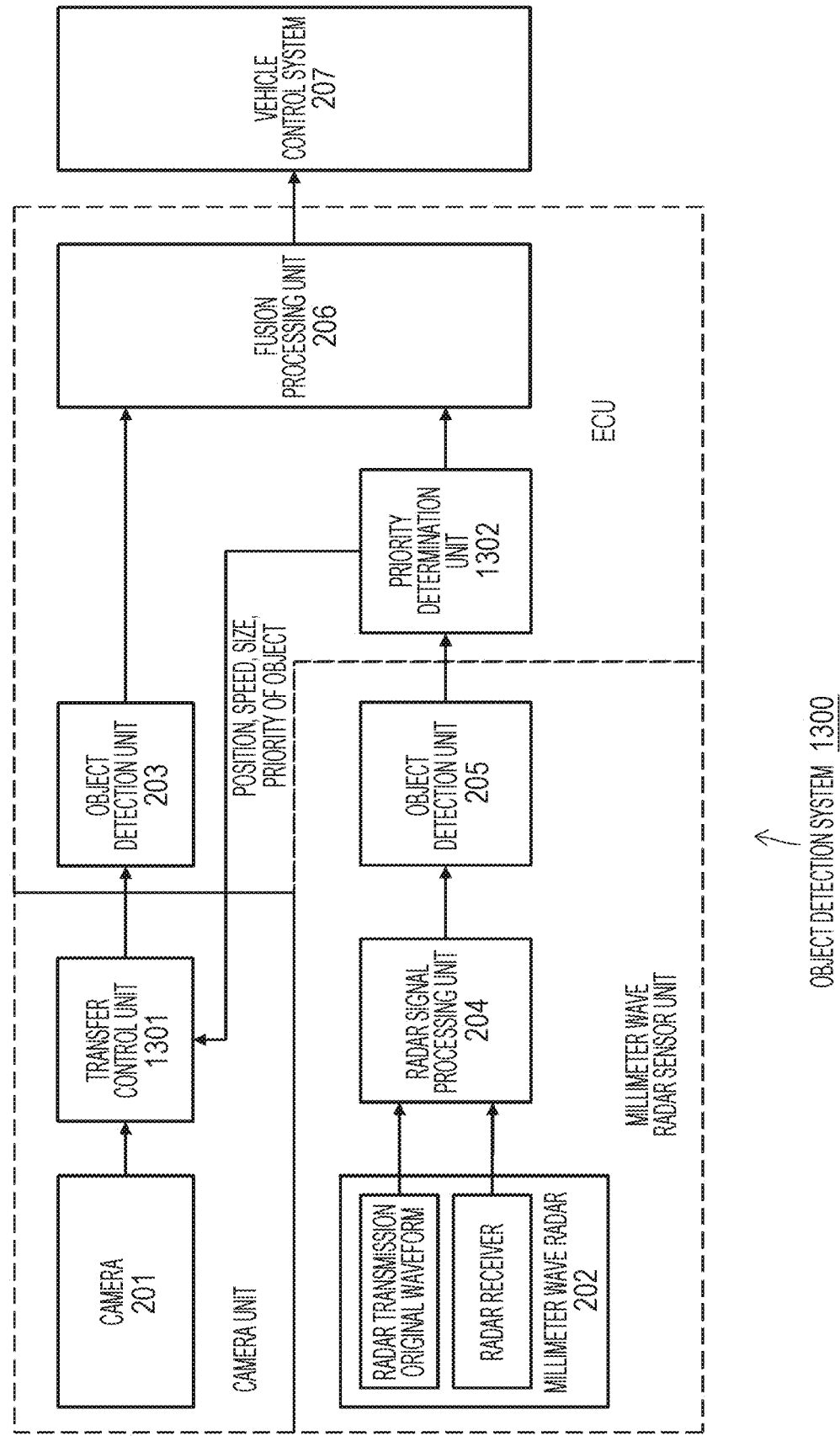
FIG. 13 is a diagram illustrating a functional configuration of an object detection system 1300 including a mechanism for preferentially processing the ROI having a higher priority.

FIG. 13 schematically illustrates a functional configuration of an object detection system 1300 including a mechanism for determining a priority of the ROI and preferentially processing the ROI having a higher priority. The object detection system 1300 may further include a function of setting an upper limit number of the ROI. However, it is assumed that the object detection system 1300 includes a mechanism for determining the ROI in the captured image by using the detection result of the millimeter wave radar 202, and controlling the transfer of the image data to the ECU, similarly to the object detection system 800 illustrated in FIG. 8. Furthermore, in FIG. 13, the same components as the object detection system 200 illustrated in FIG. 2 are indicated by the same reference numerals, and detailed description thereof will be omitted below.

The radar signal processing unit 204 performs signal processing on original waveform data of transmitted radar waves by the millimeter wave radar 202, and a reception signal of a reflected wave of the transmitted radar waves by the millimeter wave radar 202, to measure a distance, direction, size, and speed of each object reflecting the radar waves. Next, the object detection unit 205 detects a position, speed, and size of each object on the basis of a signal processing result by the radar signal processing unit 204. Then, an object ID and information on the position, speed, and size of the object for each object detected by the object detection unit 205 are transferred every frame from the sensor unit of the millimeter wave radar 202 to the ECU.

In the ECU, a priority determination unit 1302 determines a priority of each object detected by the object detection unit 205. Here, the priority determination unit 1302 determines the priority on the basis of the position and relative speed of the object. An object existing in front of a vehicle has a possibility of collision when the vehicle travels forward, so the priority of such an object is high. Furthermore, since an object having a negative relative speed is approaching the host vehicle and has a high possibility of collision, the priority of such an object is high. On the other hand, an object existing in a place outside a path of the host vehicle other than front), or an object having a positive relative speed and moving away from the host vehicle has a low possibility of collision, so the priority of such an object is Low. Note that, it is assumed that the priority determination unit 1302 outputs an output of the object detection unit 205 as it is to the fusion processing unit 206 in the subsequent stage.

Then, a transfer control unit 1301 receives, from the ECU, the information on the position, speed, and size of each object detected by the sensor unit of the millimeter wave radar 202, and the information on the priority of each object determined by the priority determination unit 1302. Then, the transfer control unit 1301 cuts out image data of an ROI by selecting from an object having a higher priority from the captured image after development processing, and outputs the image data to the object detection unit 203 in the ECU. Furthermore, the transfer control unit 1301 sets an upper limit number of ROIs that can be transferred, and stops the transfer of the image data when the upper limit is reached. The object detection unit 203 detects various objects such as a pedestrian, another vehicle, a lane, and others from the image data of the ROI received from the transfer control unit 1301 on the basis of a predetermined image recognition algorithm, and outputs the detection result to the fusion processing unit 206 in the subsequent stage.

Note that, the upper limit of the ROIs that can be transferred corresponds to the image data for the full screen. If the image data for the full screen is transmitted, the amount of transfer from the camera unit to the ECU and the amount of processing of the object detection in the ECU are the same as those in a case where image data transfer control is not performed.

The fusion processing unit 206 carries out fusion processing of information such as the position of the object detected by the object detection unit 203 from the captured image by the camera 201 with information such as the position, speed, and size of the object detected from the reception signal of the millimeter wave radar 202 by the object detection unit 205, to perform object determination processing. In a case where another outside world recognition sensor (not illustrated) is further mounted in the same vehicle, the fusion processing unit 206 may further perform fusion processing with a detection signal by the sensor. Then, the fusion processing unit 206 outputs an object determination result obtained by performing fusion processing to the vehicle control system 207.

FIG. 14 illustrates a processing procedure for determining the priority of each object detected by the object detection unit 205 in the priority determination unit 1302 in the form of a flowchart.

The priority determination unit 1302 first checks the position of the object detected by the object detection unit 205 (step S1401). Then, in a case where the object exists in front (Yes in step S1401), there is a possibility of collision when the vehicle moves forward. Thus, the priority determination unit 1302 further checks the relative speed of the object (step S1402). Then, in a case where the relative speed is negative (Yes in step S1402), the object is approaching the host vehicle and has a high possibility of collision, so a high priority is assigned to the object (step S1403), the priority is output, and this processing is ended. On the other hand, in a case where the relative speed is positive (No in step S1402), the object is moving away from the host vehicle and has a slightly low possibility of collision, so a medium priority is assigned to the object (step S1404), the priority is output, and this processing is ended.

In a case where the object detected by the object detection unit 205 exists in other than front (Yes in step S1405), the possibility of collision is lower than that in a case where the object exists in front. The priority determination unit 1302 further checks the relative speed of the object (step S1406). Then, in a case where the relative speed is negative (Yes in step S1406), the object is approaching the host vehicle and has a possibility of collision, so a medium priority is assigned to the object (step S1407), the priority is output, and this processing is ended. On the other hand, in a case where the relative speed is positive (No in step S1406), the object is moving away from the host vehicle and has an extremely low possibility of collision, so a lowest priority is assigned to the object (step S1408), the priority is output, and this processing is ended.

Note that, if a plurality of object detectors is arranged in the object detection unit 203 on the ECU side, a plurality of ROIs can be processed in parallel, and the number of ROIs that can be processed can be increased for each frame, but the circuit scale is increased. Thus, as described above, it is preferable that a priority is assigned to each object detected by the millimeter wave radar 202, and object detection is carried out in order from an ROI having a higher priority with limited hardware resources, in the object detection unit 203.

Furthermore, the image data of each ROI extracted from the captured image by the camera 201 may be subjected to time-division processing by software without extending hardware of the object detection unit 203 on the ECU side, but it is not possible to process more ROIs than the upper limit number that can be processed in the frame. Thus, as described above, it is preferable that a priority is assigned to each object detected by the millimeter wave radar 202, and object detection is carried out in order from an ROI having a higher priority within the upper limit number of processing for each frame, in the object detection unit 203.

INDUSTRIAL APPLICABILITY

In the above, the technology disclosed in this specification has been described in detail with reference to specific embodiments. However, it is obvious that those skilled in the art can make modifications and substitutions of the embodiments without departing from the scope of the technology disclosed in this specification.

In this specification, a description has been made mainly on embodiments relating to fusion of in-vehicle sensors; however, the scope of application of the technology disclosed in this specification is not limited to vehicles. The technology disclosed in this specification can be similarly applied to various types of moving body devices, for example, an unmanned aircraft such as a drone, a robot that autonomously moves in a given working space (home, office, factory, or the like), a ship, an aircraft, and the like. Of course, the technology disclosed in this specification can be similarly applied to an information terminal installed in a moving body device, and various devices that are not moving types.

In short, the technology disclosed in this specification has been described in the form of exemplification, and the description content of this specification should not be interpreted restrictively. To determine the gist of the technology disclosed in this specification, the claims should be taken into consideration.

Note that, the technology disclosed in this specification can also have the following configuration.

(1) An information processing device including
a control unit that controls an amount of information to be used for object detection in a first information sensed by a first sensor on the basis of second information sensed by a second sensor.

(2) The information processing device according to (1), in which
the first sensor is a camera, and
the control unit determines a target area to be used for object detection in a captured image by the camera on the basis of the second information.

(3) The information processing device according to (2), in which
the control unit determines the target area from the captured image on the basis of the second information regarding an object sensed by the second sensor.

(4) The information processing device according to any of (2) or (3), in which
the second sensor is a radar, and
the control unit determines the target area from the captured image on the basis of information on at least one of a position, a speed, or a size of an object detected by the radar.

(5) The information processing device according to (4), further including
a condition determination unit that determines an imaging condition of the camera, in which
the control unit determines the target area from the captured image on the basis of the information of the object detected by the radar by using a threshold value set on the basis of a determination result of the condition determination unit.
(6) The information processing device according to (5), in which
the control unit determines the target area from the captured image on the basis of the information of the object detected by the radar by using either a threshold value set high in a case where the imaging condition of the camera is good or a threshold value set low in a case where the imaging condition of the camera is not good.
(7) The information processing device according to any of (4) to (6), further including
a size determination unit that determines a size of the target area on the basis of an intensity of a reflected wave to be detected by the radar, in which
the control unit determines the target area from the captured image on the basis of the size determined by the size determination unit.
(8) The information processing device according to any of (1) to (7), in which
the control unit sets an upper limit number of the target area.
(9) The information processing device according to any of (4) to (8), further including
a priority determination unit that determines a priority of each object detected by the radar, in which
the control unit determines the target area from the captured image on the basis of the priority.
(1) The information processing device according to (9), in which
the priority determination unit determines the priority on the basis of the position and a relative speed of the object detected by the radar.
(11) The information processing device according to (10), in which
the priority determination unit determines a higher priority for an object detected in front of the information processing device or an object having a negative relative speed with respect to the information processing device.
(12) An information processing method including
a control step of controlling an amount of information to be used for object detection in a first information sensed by a first sensor on the basis of second information sensed by a second sensor.
(13) A computer program written in a computer readable format to execute, on a computer, processing for controlling an amount of information to be used for object detection in a first information sensed by a first sensor on the basis of second information sensed by a second sensor.
(14) An imaging device including:
an imaging unit; and
a control unit that determines a target area to be used for object detection in a captured image by the imaging unit on the basis of information sensed by another sensor.
(14-1) The imaging device according to (14), in which
the other sensor is a radar, and
the control unit determines the target area from the captured image on the basis of information on at least one of a position, a speed, or a size of an object detected by the radar the radar.
(15) An information processing system including:
a first object detection unit that detects an object on the basis of an amount of information determined on the basis of second information sensed by a second sensor, in first information sensed by a first sensor; and
a determination unit that determines the object by fusing an object detection result by the first object detection unit with an object detection result using the second sensor.
(16) A moving body device including:
a moving means;
a first sensor;
a second sensor;
a first object detection unit that detects an object on the basis of an amount of information determined on the basis of second information sensed by a second sensor, in first information sensed by a first sensor;
a determination unit that determines the object by fusing an object detection result by the first object detection unit with an object detection result using the second sensor; and
a drive control unit that controls drive of the moving means on the basis of a determination result by the determination unit.

REFERENCE SIGNS LIST

100 Vehicle control system
101 Input unit
102 Data acquisition unit
103 Communication unit
104 In-vehicle device
105 Output control unit
106 Output unit
107 Drive-system control unit
108 Drive-system system
109 Body-system control unit
110 Body-system system
111 Storage unit
112 Automatic driving control unit
121 Communication network
131 Detection unit
132 Self-position estimation unit
133 Situation analysis unit
134 Planning unit
135 Operation control unit
141 Vehicle exterior information detection unit
142 Vehicle interior information detection unit
143 Vehicle state detection unit
151 Map analysis unit
152 Traffic rule recognition unit
153 Situation recognition unit
154 Situation prediction unit
161 Route planning unit
162 Action planning unit
163 Operation planning unit
171 Emergency avoidance unit
172 Acceleration/deceleration control unit
173 Direction control unit
200 Object detection system
201 Camera
202 Millimeter wave radar
203 Object detection unit
204 Millimeter wave radar signal processing unit
205 Object detection unit
206 Fusion processing unit
207 Vehicle control system
700 Object detection system
701 Transfer control unit
800 Object detection system 801 Transfer control unit
1000 Object detection system
1001 Transfer control unit
1002 Condition determination unit
1100 Object detection system
1101 Transfer control unit
1102 Size determination unit
1300 Object detection system
1301 Transfer control unit
1302 Priority determination unit

The invention claimed is:

1. An information processing device comprising
a control unit that controls an amount of information to be used for object detection in a first information sensed by a first sensor on a basis of second information sensed by a second sensor; and
a condition determination unit coupled to the control unit that determines an imaging condition of the camera;
wherein
the first sensor is a camera,
the control unit determines a target area to be used for object detection in a captured image by the camera on the basis of the second information,
the second sensor is a radar, and
the control unit determines the target area from the captured image on a basis of information on at least one of a position, a speed, or a size of an object detected by the radar by using a threshold value set on a basis of a determination result of the condition determination unit.

2. The information processing device according to claim 1, wherein
the control unit determines the target area from the captured image on the basis of the second information regarding an object sensed by the second sensor.

3. The information processing device according to claim 1, wherein
the control unit determines the target area from the captured image on a basis of the information of the object detected by the radar by using either a threshold value set high in a case where the imaging condition of the camera is good or a threshold value set low in a case where the imaging condition of the camera is not good.

4. The information processing device according to claim 1, further comprising
a size determination unit that determines a size of the target area on a basis of an intensity of a reflected wave to be detected by the radar, wherein
the control unit determines the target area from the captured image on a basis of the size determined by the size determination unit.

5. The information processing device according to claim 1, wherein
the control unit sets an upper limit number of the target area.

6. The information processing device according to claim 1, further comprising
a priority determination unit that determines a priority of each object detected by the radar, wherein
the control unit determines the target area from the captured image on a basis of the priority.

7. The information processing device according to claim 6, wherein
the priority determination unit determines the priority on a basis of the position and a relative speed of the object detected by the radar.

8. The information processing device according to claim 7, wherein
the priority determination unit determines a higher priority for an object detected in front of the information processing device or an object having a negative relative speed with respect to the information processing device.

9. An information processing method comprising
a control step of controlling an amount of information to be used for object detection in a first information sensed by a first sensor on a basis of second information sensed by a second sensor;
determining an imaging condition of the camera; and
determining a target area to be used for object detection in a captured image by the camera on the basis of the second information, comprising:
determining the target area from the captured image on a basis of information on at least one of a position, a speed, or a size of an object detected by the radar by using a threshold value.

10. A computer program written on a non-transitory computer readable medium to execute, on a computer, processing for:
controlling an amount of information to be used for object detection in a first information sensed by a first sensor on a basis of second information sensed by a second sensor;
determining an imaging condition of the camera; and
determining a target area to be used for object detection in a captured image by the camera on the basis of the second information, comprising:
determining the target area from the captured image on a basis of information on at least one of a position, a speed, or a size of an object detected by the radar by using a threshold value.

11. An imaging device comprising:
an imaging unit comprising a first sensor; and
a control unit coupled to the imaging unit that determines a target area to be used for object detection in a captured image by the imaging unit on a basis of information sensed by another sensor;
wherein
the first sensor is a camera,
the control unit determines a target area to be used for object detection in a captured image by the camera on the basis of the information by the another sensor,
the another sensor is a radar, and
the control unit determines the target area from the captured image on a basis of information on at least one of a position, a speed, or a size of an object detected by the radar by using a threshold value set on a basis of a determination result of the condition determination unit.

12. An information processing system comprising:
a first object detection unit that detects an object on a basis of an amount of information determined on a basis of second information sensed by a second sensor, in first information sensed by a first sensor;
a determination unit coupled to the first object determination unit that determines the object by fusing an object detection result by the first object detection unit with an object detection result using the second sensor; and
a control unit that determines a target area to be used for object detection in a captured image by the camera on the basis of the second information, wherein
- the first sensor is a camera,
- the second sensor is a radar, and
- the control unit determines the target area from the captured image on a basis of information on at least one of a position, a speed, or a size of an object detected by the radar by using a threshold value set on a basis of a determination result of the determination unit.

13. A moving body device comprising:
- a moving means;
- a first sensor;
- a second sensor,
- a first object detection unit that detects an object on a basis of an amount of information determined on a basis of second information sensed by a second sensor, in first information sensed by a first sensor,
- a determination unit coupled to the first object detection unit that determines the object by fusing an object detection result by the first object detection unit with an object detection result using the second sensor;
- a drive control unit that controls drive of the moving means on a basis of a determination result by the determination unit and
- a control unit that determines a target area to be used for object detection in a captured image by the camera on the basis of the second information, wherein
- the first sensor is a camera,
- the second sensor is a radar, and
- the control unit determines the target area from the captured image on a basis of information on at least one of a position, a speed, or a size of an object detected by the radar by using a threshold value set on a basis of a determination result of the determination unit.

* * * * *